(12) United States Patent
Chong et al.

(10) Patent No.: US 12,302,167 B2
(45) Date of Patent: May 13, 2025

(54) USER PLANE PATH SELECTION METHOD AND APPARATUS

(71) Applicant: Huawei Technologies Co., Ltd., Shenzhen (CN)

(72) Inventors: Weiwei Chong, Shenzhen (CN); Xiaobo Wu, Shenzhen (CN); Yang Xin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 451 days.

(21) Appl. No.: 17/408,022

(22) Filed: Aug. 20, 2021

(65) Prior Publication Data

US 2021/0392540 A1 Dec. 16, 2021

Related U.S. Application Data

(63) Continuation of application No. PCT/CN2020/076221, filed on Feb. 21, 2020.

(30) Foreign Application Priority Data

Feb. 22, 2019 (CN) .......................... 201910133914.8

(51) Int. Cl.
*H04W 28/02* (2009.01)
*H04W 40/02* (2009.01)

(52) U.S. Cl.
CPC ....... *H04W 28/0268* (2013.01); *H04W 40/02* (2013.01)

(58) Field of Classification Search
CPC ............. H04W 28/0268; H04W 40/02; H04L 45/306; H04L 47/803; H04L 47/805; H04L 47/808; H04L 47/726; H04L 45/30
See application file for complete search history.

(56) References Cited

U.S. PATENT DOCUMENTS

| 2016/0381698 A1 | 12/2016 | Grinshpun et al. |
| 2017/0111844 A1 | 4/2017 | Routt et al. |
| 2017/0332282 A1 | 11/2017 | Dao |

(Continued)

FOREIGN PATENT DOCUMENTS

| CN | 102469082 A | 5/2012 |
| CN | 106304228 A | 1/2017 |

(Continued)

OTHER PUBLICATIONS

ETSI, MEC in 5G, Jun. 2018 (Year: 2018).*

(Continued)

*Primary Examiner* — Faruk Hamza
*Assistant Examiner* — Aixa A Guadalupe Cruz
(74) *Attorney, Agent, or Firm* — Conley Rose, P.C.

(57) ABSTRACT

This application provides a user plane path selection method and an apparatus. The method includes: A first network element determines, based on at least one service type corresponding to a terminal device, service experience analytics data corresponding to the at least one service type, and then selects one or more user plane paths for a session of the terminal device based on the service experience analytics data. This enables a user plane path to be associated with a service, helps select a more appropriate user plane path for the terminal device, and can improve communication efficiency.

19 Claims, 5 Drawing Sheets

(56) References Cited

U.S. PATENT DOCUMENTS

| | | |
|---|---|---|
| 2018/0184332 A1 | 6/2018 | Dai et al. |
| 2018/0262924 A1 | 9/2018 | Dao et al. |
| 2018/0270314 A1 | 9/2018 | Mladin et al. |
| 2019/0132226 A1 | 5/2019 | Zhang et al. |
| 2019/0261164 A1 | 8/2019 | Cai |
| 2021/0083956 A1* | 3/2021 | Fan ............... H04L 43/0876 |
| 2021/0288886 A1* | 9/2021 | Örtenblad ............ H04W 40/02 |
| 2021/0351993 A1* | 11/2021 | Puente ................. H04L 41/046 |

FOREIGN PATENT DOCUMENTS

| | | |
|---|---|---|
| CN | 106332129 A | 1/2017 |
| CN | 107484224 A | 12/2017 |
| JP | 2018523383 A | 8/2018 |
| JP | 2018530965 A | 10/2018 |
| WO | 2018000363 A1 | 1/2018 |
| WO | 2018059043 A1 | 4/2018 |
| WO | 2018161850 A1 | 9/2018 |

OTHER PUBLICATIONS

"Zero-touch network and Service Management (ZSM); Landscape, Release 1" Draft ETSI GR ZSM-004 V0.3.0, Feb. 2, 2019, pp. 1-51, XP014335428.

3GPP TR 23.799, V14.0.0, "3rd Generation Partnership Project; Technical Specification Group Services and System Aspects; Study on Architecture for Next Generation System (Release 14)," Dec. 16, 2016, pp. 1-527, XP051295448.

3GPP TR 23. 791 V16. 0.0, "Study of Enablers Network Automation for 5G," Dec. 2018, 7 pages.

3GPP TS 23.502 V15.4.1 "3rd Generation Partnership Project; Technical Specification Group Services and System Aspects;Procedures for the 5G System;Stage 2(Release 15)," Jan. 2019, 347 pages.

3GPP TS 23.501 V15.4.0: "3rd Generation Partnership Project;Technical Specification Group Services and System Aspects;System Architecture for the 5G System;Stage 2(Release 15)", Dec. 2018, 236 pages.

3GPP TS 23.503 V15.4.0 (Dec. 2018), 3rd Generation Partnership Project; Technical Specification Group Services and System Aspects; Policy and Charging Control Framework for the 5G System; Stage 2(Release 15), 76 pages.

3GPP TS 23.288 V0.1.0 (Feb. 2019), 3rd Generation Partnership Project; Technical Specification Group Services and System Aspects; Architecture enhancements for 5G System (5GS) to support network data analytics services; (Release 16), 40 pages.

Samsung, et al., "Key Issue 6 Solution Evaluation and Conclusion," 3GPP TSG SA WG2 #129BIS, S2-1812796, Nov. 30, 2018, 7 pages.

* cited by examiner

USER PLANE PATH SELECTION METHOD AND APPARATUS

CROSS-REFERENCE TO RELATED APPLICATIONS

This is a continuation of International Patent Application No. PCT/CN2020/076221 filed on Feb. 21, 2020, which claims priority to Chinese Patent Application No. 201910133914.8 filed on Feb. 22, 2019. The disclosures of the aforementioned applications are hereby incorporated by reference in their entireties.

TECHNICAL FIELD

This application relates to the field of mobile communication technologies, and in particular, to a user plane path selection method and an apparatus.

BACKGROUND

A network element selection in a user plane path mainly involves user plane function network element selection, and a user plane function network element selection method is usually as follows: a session management network element comprehensively considers information such as a data network name (DNN), a location of a terminal device, and load of a user plane function network element, and selects a user plane function network element for the terminal device.

A main problem in the foregoing user plane function network element selection method is that the session management network element may select a user plane function network element that cannot meet a service requirement, for example, select a remote user plane function network element, and the remote user plane function network element cannot meet a delay requirement of a mobile edge computing (MEC) service.

SUMMARY

This application provides a user plane path selection method and an apparatus, to select a more appropriate user plane path for a terminal device, thereby improving communication efficiency.

According to a first aspect, this application provides a user plane path selection method. The method includes a first network element determines at least one service type corresponding to a terminal device, and the first network element selects a user plane path for a session of the terminal device based on service experience analytics data corresponding to the at least one service type. Based on this solution, the first network element determines, based on the at least one service type corresponding to the terminal device, the service experience analytics data corresponding to the at least one service type, and then selects one or more user plane paths for the session of the terminal device based on the service experience analytics data. This enables a user plane path to be associated with a service, helps select a more appropriate user plane path for the terminal device, and can improve communication efficiency.

In a possible implementation, the first network element obtains service behavior analytics data of the terminal device from a data analytics network element, and determines the at least one service type based on the service behavior analytics data of the terminal device.

In a possible implementation, the first network element obtains service behavior data of the terminal device when the session is established, and determines the at least one service type based on the service behavior data of the terminal device when the session is established and service behavior analytics data.

In a possible implementation, the first network element sends a request message to the data analytics network element, where the request message includes a filter condition, and where the request message is used to request the service behavior analytics data that is of the terminal device and that meets the filter condition. Additionally, the first network element receives the service behavior analytics data of the terminal device from the data analytics network element, where the service behavior analytics data meets the filter condition.

In a possible implementation, the filter condition includes time information and/or location information.

In a possible implementation, the service behavior analytics data includes at least one of the following: identification information of a service, an occurrence probability of the service, duration of the service, a weight factor of the service, a location of the terminal device when the service occurs, or a time when the service occurs.

In a possible implementation, the first network element selects one user plane path for the session of the terminal device, where the user plane path meets a service experience requirement corresponding to the at least one service type.

In a possible implementation, the first network element selects a plurality of user plane paths for the session of the terminal device, where the plurality of user plane paths separately meets a service experience requirement corresponding to the at least one service type.

In a possible implementation, when the session is established, the first network element selects the user plane path for the session of the terminal device.

In another possible implementation, when the terminal device initiates a service on the session, the first network element selects the user plane path for the service of the terminal device.

In a possible implementation, the first network element obtains, from the data analytics network element, the service experience analytics data corresponding to the at least one service type. In a possible implementation, the first network element obtains identification information of a user plane path and the service experience analytics data that correspond to the at least one service type.

Optionally, the identification information of the user plane path includes at least one of the following information: identification information of a user plane function network element or identification information of a media plane server.

In a possible implementation, the first network element sends a request message to the data analytics network element, where the request message includes identification information of the at least one service type, and where the first network element receives, from the data analytics network element, the identification information of the user plane path and the service experience analytics data that correspond to the at least one service type.

In a possible implementation, the first network element sends a request message to the data analytics network element, where the request message includes identification information of the at least one service type and a filter condition, and where the filter condition is used to determine the identification information that is of the user plane path and that corresponds to the identification information of the at least one service type. Further, the first network element receives, from the data analytics network element, the identification information of the user plane path and the service experience analytics data that correspond to the at least one service type.

In a possible implementation, the first network element sends a request message to the data analytics network element, where the request message includes identification information of the at least one service type and the identification information that is of the user plane path and that corresponds to the identification information of the at least one service type, and where the first network element receives, from the data analytics network element, the identification information of the user plane path and the service experience analytics data that correspond to the at least one service type.

In a possible implementation, after selecting the user plane path for the session of the terminal device, the first network element determines that the user plane path cannot meet a service experience requirement of a service initiated by the terminal device on the session, and the first network element reselects a user plane path for the initiated service based on service experience analytics data corresponding to the initiated service.

In a possible implementation, the first network element is a session management network element or a policy control network element, and the first network element selects a user plane function network element in the user plane path for the session of the terminal device.

In a possible implementation, the first network element selects a media plane server in the user plane path for the session of the terminal device.

In a possible implementation, the first network element sends first indication information to a server, where the first indication information is used to indicate the identification information of the user plane path.

In a possible implementation, the first network element is a server, and the first network element selects a media plane server in the user plane path for the session of the terminal device.

In a possible implementation, the first network element sends second indication information to a session management network element or a policy control network element, where the second indication information is used to indicate identification information of the media plane server.

According to a second aspect, this application provides a communication method. The method includes: a data analytics network element obtains service experience analytics data corresponding to at least one service type; and the data analytics network element sends the service experience analytics data corresponding to the at least one service type to a first network element. Based on this solution, the data analytics network element may send the service experience analytics data corresponding to the at least one service type to the first network element. As such, the first network element may select one or more user plane paths for a session of a terminal device based on the service experience analytics data corresponding to the at least one service type. This enables a user plane path to be associated with a service, helps select a more appropriate user plane path for the terminal device, and can improve communication efficiency.

In a possible implementation, the data analytics network element determines service experience analytics data of a first service type in the at least one service type.

In a possible implementation, that the data analytics network element determines service experience analytics data of a first service type in the at least one service type includes the following: the data analytics network element obtains service data of the first service type from a server corresponding to the first service type, where the service data includes a service experience measurement value and identification information of a media plane server; the data analytics network element obtains, from a network, network data associated with the service data of the first service type, where the network data includes identification information of a user plane function network element transmitting a service packet of the first service type; and the data analytics network element determines the service experience analytics data of the first service type based on the service data and the network data.

In a possible implementation, the data analytics network element sends, to the first network element, identification information that is of a user plane path and that corresponds to the service experience analytics data.

In a possible implementation, the data analytics network element receives a request message sent by the first network element, where the request message includes identification information of the at least one service type.

In a possible implementation, the data analytics network element receives a request message sent by the first network element, where the request message includes identification information of the at least one service type and the identification information that is of the user plane path and that corresponds to the identification information of the at least one service type.

In a possible implementation, the data analytics network element receives a request message sent by the first network element, where the request message includes identification information of the at least one service type and a filter condition, and where the filter condition is used to determine the identification information that is of the user plane path and that corresponds to the identification information of the at least one service type.

In a possible implementation, the data analytics network element obtains service behavior analytics data of the terminal device, and the data analytics network element sends the service behavior analytics data of the terminal device to the first network element.

In a possible implementation, the data analytics network element receives a request message from the first network element, where the request message includes a filter condition, and the data analytics network element obtains the service behavior analytics data that is of the terminal device and that meets the filter condition.

In a possible implementation, the filter condition includes time information and/or location information.

In a possible implementation, the service behavior analytics data includes at least one of the following: identification information of a service, an occurrence probability of the service, duration of the service, a weight factor of the service, a location of the terminal device when the service occurs, or a time when the service occurs.

In a possible implementation, the first network element is a session management network element or a policy control network element, and the identification information of the user plane path includes identification information of a user plane function network element.

In a possible implementation, the identification information of the user plane path further includes identification information of a media plane server.

In a possible implementation, the first network element is a server, and the identification information of the user plane path includes identification information of a media plane server.

According to a third aspect, this application provides an apparatus. The apparatus has a function of implementing the user plane path selection method according to any one of the foregoing aspects or the implementations of the foregoing aspects. The function may be implemented by hardware, or may be implemented by hardware executing corresponding software. The hardware or the software includes one or more modules corresponding to the function.

According to a fourth aspect, this application provides an apparatus. The apparatus includes a processor and a memory, where the memory is configured to store computer-executable instructions, and when the apparatus runs, the processor executes the computer-executable instructions stored in the memory, to enable the apparatus to perform the user plane path selection method according to any one of the foregoing aspects or the implementations of the foregoing aspects.

According to a fifth aspect, this application provides an apparatus. The apparatus includes units or means configured to perform the steps in any one of the foregoing aspects.

According to a sixth aspect, this application provides an apparatus. The apparatus includes a processor and an interface circuit, where the processor is configured to communicate with another apparatus through the interface circuit, and perform the method according to any one of the foregoing aspects. There are one or more processors.

According to a seventh aspect, this application provides an apparatus. The apparatus includes a processor configured to be connected to a memory, and invoke a program stored in the memory, to perform the method according to any one of the foregoing aspects and the implementations of the foregoing aspects. The memory may be located inside the apparatus, or may be located outside the apparatus. In addition, there are one or more processors.

According to an eighth aspect, this application further provides a computer-readable storage medium. The computer-readable storage medium stores instructions, and when the instructions are run on a computer, a processor is enabled to perform the method according to any one of the foregoing aspects.

According to a ninth aspect, this application further provides a computer program product including instructions. When the computer program product runs on a computer, the computer is enabled to perform the method according to any one of the foregoing aspects.

According to a tenth aspect, this application further provides a chip system. The chip system includes a processor configured to perform the methods according to the foregoing aspects.

According to an eleventh aspect, this application further provides a communication system. The system includes a first network element configured to perform the method according to any one of the first aspect or the implementations of the first aspect, and a data analytics network element configured to perform the method according to any one of the second aspect or the implementations of the second aspect.

DETAILED DESCRIPTION OF EMBODIMENTS

To make objectives, technical solutions, and advantages of this application clearer, the following further describes this application in detail with reference to the accompanying drawings. A specific operation in a method embodiment may also be used in an apparatus embodiment or a system embodiment. In the descriptions of this application, unless otherwise specified, "a plurality of" means two or more than two.

Figure 1:
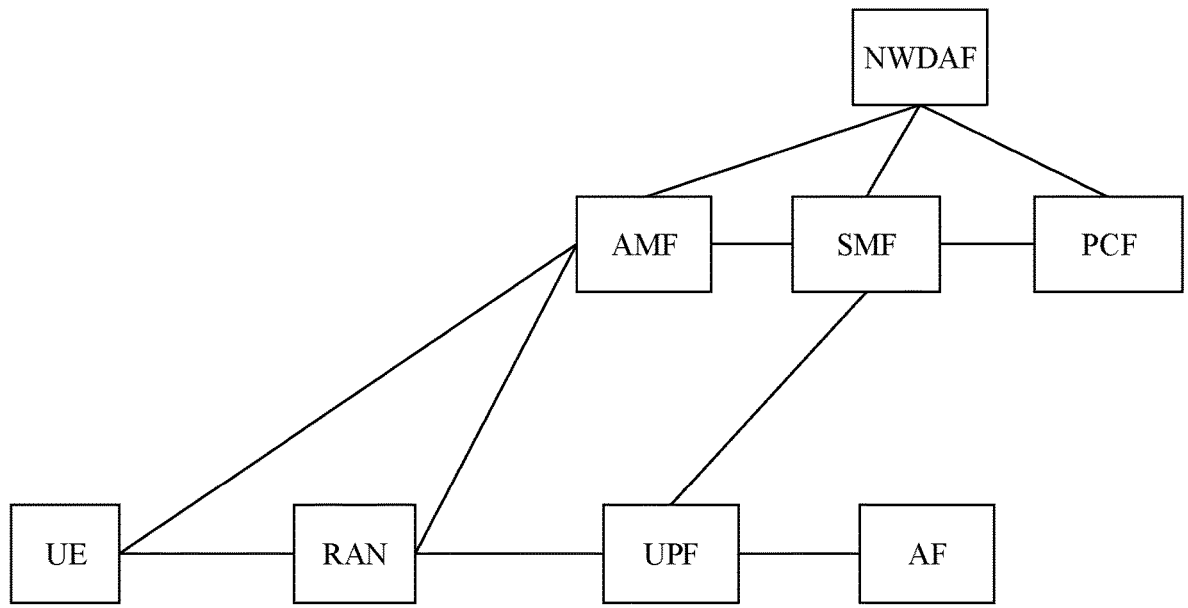
FIG. 1 is a schematic diagram of a possible network architecture according to this application.

FIG. 1 is a schematic diagram of a 5th generation (5G) network architecture. Some network elements of the 5G architecture are shown in the figure. A user plane function (UPF) network element includes at least one of the following functions: packet routing and transmission, packet detection, service usage reporting, quality of service (QoS) processing, lawful interception, uplink packet detection, or downlink packet storage. An access and mobility management function (AMF) network element is responsible for user mobility management, and includes at least one of the following functions: mobility status management, user temporary identity allocation, and user authentication and authorization.

A session management function (SMF) network element includes at least one of the following functions: session management (for example, session establishment, modification, and release, including tunnel maintenance between a UPF and an access network (AN)), UPF network element selection and control, service and session continuity (SSC) mode selection, or roaming.

A policy control function (PCF) network element includes at least one of the following functions: user subscription data management, policy control, charging policy control, and QoS control.

An application function (AF) network element includes at least one of the following functions: a function of processing application-related signaling and media data, or a function of performing QoS authorization interaction of an application with a network side.

A network data analytics function (NWDAF) network element can collect data from a network function (NF) network element, an operation, administration, and maintenance (OAM) system, a terminal device, or an AF network element, and analyze the collected data to obtain a data analytics result. The NWDAF network element may further send the obtained data analytics result to the NF, the OAM system, the terminal device, or the AF network element, such that these entities perform corresponding policy formulation, operation execution, and the like.

A mobility management network element in this application may be the AMF network element shown in FIG. 1, or may be a network element that is in a future communication system and that has the function of the AMF network element. A user plane function network element in this application may be the UPF network element shown in FIG. 1, or may be a network element that is in a future communication system and that has the function of the UPF network element. A session management network element in this application may be the SMF network element shown in FIG. 1, or may be a network element that is in a future communication system and that has the function of the SMF network element. A data analytics network element in this application may be the NWDAF network element shown in FIG. 1, or may be a network element that is in a future communication system and that has the function of the NWDAF network element. A server in this application may be the AF network element shown in FIG. 1, or may be a network element that is in a future communication system and that has the function of the AF network element. A policy control network element in this application may be the PCF network element shown in FIG. 1, or may be a network element that is in a future communication system and that has the function of the PCF network element.

It should be noted that the user plane function network element in this application is short for a core network user plane function network element. The user plane function network element and the core network user plane function network element have a same meaning, and this is not separately described subsequently.

It should be noted that this application may also be applied to a 4th generation (4G) network architecture. For example, a mobility management entity (MME) in 4G provides a function of the mobility management network element in this application, an MME and a serving gateway (SGW) in 4G provide a function of the session management network element in this application, a packet data network (PDN) gateway (PGW) in 4G provides a function of the core network user plane function network element in this application, a policy and charging rules function (PCRF) in 4G provides a function of the policy control network element in this application, an NWDAF in 4G provides a function of the data analytics network element in this application, and an AF in 4G provides a function of the server in this application.

An access network device (which may also be referred to as a radio access network (RAN) device) in this application is a device that provides a wireless communication function for a terminal. The access network device includes but is not limited to a next generation base station (gNodeB or gNB) in 5G, an evolved NodeB (eNB), a Radio Network Controller (RNC), a NodeB (NB), a base station controller (BSC), a base transceiver station (BTS), a home base station (for example, a home evolved NodeB, or a home NodeB (HNB)), a baseband unit (BBU), a transmission reception point (TRP), a transmission point (TP), a mobile switching center, and the like.

A terminal device (or a user equipment (UE)) in this application is a device having a wireless transceiver function, and may be deployed on land, where the deployment includes indoor or outdoor, or handheld or vehicle-mounted deployment, may be deployed on water (for example, on a ship), or may be deployed in air (for example, on an aerocraft, a balloon, and a satellite). The terminal may be a mobile phone, a tablet computer (IPAD), a computer having a wireless transceiver function, a virtual reality (VR) terminal, an augmented reality (AR) terminal, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, and the like.

For ease of description, an example in which the mobility management network element is an AMF network element, the session management network element is an SMF network element, the policy control network element is a PCF network element, the user plane function network element is a UPF network element, the data analytics network element is an NWDAF network element, and the server is an AF network element is subsequently used in this application for description. Further, the AMF network element is referred to as an AMF, the SMF network element is referred to as an SMF, the PCF network element is referred to as a PCF, the UPF network element is referred to as a UPF, the NWDAF network element is referred to as an NWDAF, the AF network element is referred to as an AF, the terminal device is referred to as UE, and the access network device is referred to as a RAN. In other words, in subsequent descriptions of this application, an AMF may be replaced with a mobility management network element, an SMF may be replaced with a session management network element, a PCF may be replaced with a policy control network element, a UPF may be replaced with a user plane function network element, an NWDAF may be replaced with a data analytics network element, an AF may be replaced with a server, a RAN may be replaced with an access network device, and UE may be replaced with a terminal device.

Usually, a user plane path selected for a terminal device includes various network elements (for example, a base station, a user plane function network element, and a media plane server). For different types of services, different service experience (for example, end-to-end service delays, packet loss rates, service mean opinion scores (MOS)) can be achieved by using different user plane paths. For example, a network element in an MEC user plane path can meet an MEC delay requirement, and a network element in a non-MEC user plane path cannot meet the MEC delay requirement.

A network element selection in a user plane path mainly involves user plane function network element selection, and a user plane function network element selection method is usually as follows. A session management network element comprehensively considers information such as a DNN, a location of a terminal device, and load of a user plane function network element, and selects a user plane function network element for the terminal device.

A main problem in the foregoing user plane function network element selection method is that the user plane function network element selected by the session management network element is not associated with a specific service, and consequently the selected user plane function network element cannot meet a requirement of the specific service. For example, the session management network element selects a user plane function network element in an establishment procedure of a session (for example, a protocol data unit (PDU) session). Because a specific service is not involved in the establishment procedure of the session, a requirement related to the service (for example, a delay requirement or an MOS requirement of an MEC service) is not considered. Consequently, the session management network element may select a user plane function network element that cannot meet the service requirement, for example, select a remote user plane function network element, and the remote user plane function network element cannot meet the delay requirement of the MEC service.

To resolve this problem, this application provides a user plane path selection method. The method may be used to select one or more user plane paths for a UE, where the user plane path is a transmission path of a user packet, and where one user plane path includes a plurality of nodes, such as a RAN, a UPF (for example, a branching point UPF or an anchor UPF), and a media plane server. Usually, when the UE is served by a RAN corresponding to a specific location, different user plane paths of the UE are paths corresponding to different UPFs and media plane servers.

Different user plane paths correspond to different path lengths, different node load (such as UPF load), and different node processing capabilities (for example, a media plane server corresponding to an MEC data network access identifier (DNAI) can distribute content to a local user, but a media plane server corresponding to a central DNAI may store more abundant content). As a result, when different user plane paths are used to transmit data of a specific service, a UE/AF obtains different service experience. For example, an MOS is used as an example. When a user plane path 1 (corresponding to a UPF 1 ID+an MEC DNAI) is used, an MOS is equal to 4, when a user plane path 2 (corresponding to a UPF 2 ID+a central DNAI) is used, an MOS is equal to 2. The reverse is also true. In addition, impact of the user plane path on the service experience is constantly and dynamically changed. For example, for a specific path, different service experience may be achieved in different periods or at different places.

The media plane server may also be referred to as a content server, and is a function network element that receives, processes, stores, and forwards media plane data of a service at an application layer. The media plane server may be independently deployed, or may be jointly deployed with an AF, for example, may belong to a part of the AF function network element. One media plane server corresponds to one DNAI. In other words, one DNAI may be used to identify one media plane server. One AF corresponds to one or more media plane servers. For example, a service provider deploys one global central AF and a plurality of media plane servers. Some media plane servers are deployed at a central location of a network as central media plane servers, and some media plane servers are deployed at an edge location as MEC media plane servers.

According to the user plane path selection method provided in this application, a service type corresponding to a service to be initiated by a UE is predicted based on historical service behavior of the UE, and a UPF and a media plane server in a user plane path are selected for the UE with reference to the service type. In addition, when the user plane path is selected for the specific service, service experience, such as service MOS s or delay experience, that can be achieved by using different user plane paths is further considered.

In addition, in this application, the UPF and the media plane server in the selected user plane path are associated, and both the UPF and the media plane server affect service experience of the service type. In other words, selection of the UPF and selection of the media plane server need to be considered in combination. However, in the current technology, an SMF or a PCF obtains a DNAI list and a corresponding applicable condition from an AF, and then selects a DNAI based on a specific scenario (for example, a time, a place, or a user object). A media plane server corresponding to the DNAI selected by the SMF or the PCF is not directly associated with service experience, and does not necessarily match a selected UPF.

Therefore, the user plane path selected according to the method in this application is associated with the specific service, the service is the service that is predicted to be initiated by the UE based on the historical service behavior of the UE, and the UPF and the media plane server in the selected user plane path are associated with the service and affect the service experience of the service. Because the user plane path is selected for the UE with reference to the specific service type, a problem in the background can be resolved, that is, the selected user plane path can meet a requirement of the specific service.

A "time" in this application is also sometimes referred to as "time information", and both the "time" and the "time information" have a same meaning. A "location" in this application is also sometimes referred to as "location information", and both the "location" and the "location information" have a same meaning.

It should be noted that representation forms of a "time" and a "location" described subsequently are not limited in this application. For example, the time may be an absolute time, for example, from 00:00 on Jan. 1, 2017 to 24:00 on Jan. 30, 2017, or for another example, every Monday to Friday, the time may alternatively be a relative time, for example, within a month relative to a specified time point. A granularity of the time information may be an hour, or may be a minute or a day. This is not limited in the embodiments of this service. For another example, the location may be a location defined in a 3rd Generation Partnership Project (3GPP) communication network, which may be referred to as a communication network location, for example, a serving cell A or a registration area B, the location may alternatively be a location defined in a non-3GPP communication network, for example, a specific geographic location, for example, a longitude and latitude or a Global Positioning System (GPS) location, which may be referred to as geographic information. This is not limited in the embodiments of this application.

Based on an architecture shown in FIG. 1, the following further describes the user plane path selection method in this application.

An NWDAF collects data and performs model training based on the collected data, to obtain, through analytics, a service behavior model of UE/a user group and a service experience model of a specific service type. The data herein refers to sample data used by the NWDAF to perform the model training, and includes at least one of the following data: network data collected from an operator network (for example, a 5G NF (for example, an AMF, an SMF, or a PCF)), service data collected from an AF, UE data collected from a user, or management data collected from an OAM.

The following separately describes a service behavior model of UE/a user group and a service experience model of a specific service type.

1. Service Behavior Model of UE/a User Group

A service behavior model herein is used to represent a feature of a service used by UE/a user group, for example, one or more types of services used by the UE/the user group at a specific location and at a specific time, and feature data such as a usage probability, duration, and a concurrent service type of each type of service. An NWDAF collects related historical data of the UE/the user group (for example, historical service data that is of the UE/the user group and that is obtained from an AF, historical network data that is related to the UE/the user group and that is obtained from an NF or an OAM, or historical service data obtained from the UE/the user group), and analyzes the data, to obtain the service behavior model of the UE/the user group. It should be noted that a specific method (or algorithm) in which the NWDAF obtains the service behavior model through training is not limited in this application. For details, refer to a related solution in a current technology. Details are not described herein again.

A service behavior model at a granularity of UE is used as an example. Table 1 shows an example of input data (that is, data collected by an NWDAF) related to the service behavior model.

Table 2 shows output data obtained after the data in Table 1 is input into the service behavior model (where the output data includes service behavior analytics data of the UE).

The service behavior analytics data of the UE herein refers to service data that is of the UE and that is obtained after behavior of a service (that is, one or more historical services) that has been executed by the UE is analyzed, and is used to represent or record a related feature of the service executed by the UE. For example, the service behavior analytics data of the UE may include but is not limited to at least one of the following information: identification information of the service, an occurrence probability of the service, duration of the service, a weight factor of the service, a location of the UE when the service occurs, or a time when the service occurs. Additionally, the service behavior analytics data of the UE may further include but is not limited to at least one of the following information: a type of a concurrent service of the service, identification information of the concurrent service, an occurrence probability of the concurrent service, a weight factor of the concurrent service, duration of the concurrent service, and the like. The identification information of the service is used to identify one or more types of services initiated by the UE.

In a possible design, the service behavior analytics data that is of the UE and that is output by the NWDAF may be differentiated based on service types. To be more specific, the service behavior analytics data includes service behavior analytics data of one or more service types, and service behavior analytics data of each service type is used to represent a related feature of the service type. In another possible design, the service behavior analytics data that is of the UE and that is output by the NWDAF may not be differentiated based on service types, and the output service behavior analytics data of the UE is stored in any format.

TABLE 1

Input data related to the service behavior model

| Information | Source | Description |
| --- | --- | --- |
| UE ID | AF/SMF/AMF | Identification information of the UE, used to uniquely identify the UE, for example, an international mobile subscriber identity (IMSI), a generic public subscription identity (GPSI), or a subscription permanent identifier (SUPI) |
| Correlation ID | AF | An Internet Protocol (IP) quintuplet or a new temporary identifier that is allocated by a 5G Core (5GC), which is used by the NWDAF to associate data from the AF and data from an NF |
| Timestamp | AF/SMF/AMF | Timestamp |
| UE location | AMF | Location information of the UE, which may be information about a network location or another geographic location, for example, an identifier of a base station or a cell |
| Application information | AF | Application-related information |
| >Application ID x | AF | Identification information of an application, used to uniquely identify the application x |
| >Reference weight factor | AF | Reference weight factor of the application x |
| >Duration time | AF | Duration of the application x |
| >Concurrent application(s) | AF | Concurrent application type(s) of the application x |
| . . . | . . . | . . . |

TABLE 2

Output data of the service behavior model of the UE (where the output data includes the service behavior analytics data of the UE)

| Information | Source | Description |
| --- | --- | --- |
| UE ID | NWDAF | Identification information of the UE, used to uniquely identify the UE, for example, the IMSI, the GPSI, or the SUPI |
| >Timestamp/Period | NWDAF | Moment/Period |
| >UE location | NWDAF | Location information of the UE, which may be the information about the network location or the other geographic location |
| >>Application ID x | NWDAF | Identification information of the application, used to uniquely identify the application x |
| >>Probability | NWDAF | Occurrence probability of the application x |
| >>Weight factor | NWDAF | Weight factor of the application x |
| >>Duration time | NWDAF | Duration of the application x |
| >>Concurrent application(s) | NWDAF | Concurrent application type(s) of the application x |
| >>>Application ID y | | Identification information of a concurrent application y, used to uniquely identify the application y |

TABLE 2-continued

Output data of the service behavior model of the UE (where the output data includes the service behavior analytics data of the UE)

| Information | Source | Description |
|---|---|---|
| >>>Probability | | Occurrence probability of the concurrent application y |
| >>>Priority/Importance | | Weight factor of the concurrent application y |
| >>>Duration time | | Duration of the concurrent application y |
| ... | ... | ... |

Referring to Table 1, the NWDAF may collect service-related data (that is, the input data) of the UE that is shown in Table 1, and analyze the data, to obtain the output data shown in Table 2, where the output data includes the service behavior analytics data of the UE.

2. Service Experience Model

An NWDAF collects a large amount of data, and analyzes the collected data, to obtain a service experience model of a specific service type. The service experience model herein may be, for example, a service MOS model, and is used to represent a relationship indicating variation of service experience with feature data. The feature data is data that is related to the service experience and that affects quality of the service experience. The feature data is data collected by the NWDAF, and may include, for example, data from a network, data from an AF, and data from UE. A method for training the service experience model is not limited in this application. For details, refer to a related method in a current technology.

For example, training of a service experience model may include the following several steps.

Step A: An NWDAF may collect historical service data of a service from an AF, and obtain historical network data from a network element (for example, a RAN, an AMF, an SMF, a UPF, or an OAM).

For example, the service data in this application may be data of a parameter such as a bandwidth, a delay, a packet loss rate, a jitter buffer, a Transmission Control Protocol (TCP) congestion window, a TCP receive window, a media codec type, or a media codec rate, an MOS measurement value, and identification information (for example, a DNAI) of a media plane server.

The network data in this application may be any one of the following parameters: a bandwidth, a delay, a packet loss rate, a reference signal received power (RSRP), a reference signal received quality (RSRQ), a block error rate (BLER), a channel quality indication (CQI), network slice identification information, a DNN, identification information of a core network user plane function network element, or identification information of an access network element.

In an example, as shown in Table 3, the NWDAF obtains, through the AF network element, historical service data corresponding to one or more services such as a video service, a payment service, an automatic driving service, or a vertical service. As shown in Table 4, the NWDAF may obtain historical network data from a 5G NF.

TABLE 3

Service data collected by the NWDAF from the AF

| Information | Description |
|---|---|
| Application ID | Identification information of the application, used to uniquely identify the application |

TABLE 3-continued

Service data collected by the NWDAF from the AF

| Information | Description |
|---|---|
| Correlation ID | An IP quintuplet or a new temporary identifier that is allocated by a 5GC, which is used by the NWDAF to associate the data from the AF and the data from the NF |
| Time stamp | Time stamp |
| UE location | Location information of a UE, which may be information about a network location or another geographic location, for example, an identifier of a base station or a cell |
| MOS measurement | Value that is provided by the AF and that is used to evaluate quality of service experience |
| Media server ID | Used to identify a media plane processing server of the application, which may be information about an address or an identifier of the media plane server, for example, a DNAI |

TABLE 4

Network data collected by the NWDAF from the network element

| Information | Description |
|---|---|
| UE ID | Identification information of the UE, used to uniquely identify the UE, for example, an IMSI, a GPSI, or an SUPI |
| Correlation ID | Identifier used to associate the two types of data |
| Application ID | Identification information of the application, used to uniquely identify the application |
| Time stamp | Time stamp |
| UE location | Location information of the UE, which may be the information about the network location or the other geographic location, for example, the identifier of the base station or the cell |
| QoS flow ID (QFI) | Identifier of a QoS flow |
| QoS flow bit rate measurement | Measurement value of a rate of the quality of service flow, for example, a flow bit rate (FBR) |
| QoS flow packet delay budget measurement | Measurement value of a packet loss rate of the quality of service flow, for example, a packet delay budget (PDB) |
| QoS flow packet error rate measurement | Measurement value of a packet error rate of the quality of service flow, for example, a packet error rate (PER) |
| UPF ID | Identification information of a UPF, used to uniquely identify the UPF |

Step B: A data analytics network element analyzes the historical network data and the historical service data, to obtain a service experience model of the application.

The service experience model is a relationship indicating variation of service experience with network data. For example, the service experience model is shown in the following formula (1):

$$H(x) = W0X0 + W1X1 + W2X2 + W3X3 + W4X4 + W5X5 + \ldots + WnXn. \quad (1)$$

The variable X (X0, X1, ..., Xn) represents each piece of network data. For example, X1 may be the FBR, X2 may be the PDB, and X3 may be the PER. Wn represents a weight of an $n^{th}$ variable, n represents a quantity of variables, and Xn represents the $n^{th}$ variable. n is an integer greater than or equal to 1. A value of H(x) is a value representing quality of service experience. For example, the MOS measurement value in Table 5 may be used as sample data of the value representing the quality of the service experience.

Step C: The data analytics network element can derive the value of H(X) based on the model relationship and current actual or predicted network data X. The value representing the quality of the service experience that is derived by the NWDAF is service experience analytics data described in this application.

The foregoing method is an example in which the NWDAF obtains the service experience analytics data based on the service experience model. The service experience analytics data is data that can be used to represent the quality of the service experience and that is obtained by the NWDAF through analytics. For example, a larger value of the service experience analytics data indicates better service experience.

Table 5 shows an example of a training result of the service experience model, that is, Table 5 shows a correspondence between feature data (including a service type, a UE location, a timestamp/period, and identification information of a user plane path) and service experience. It may be understood that the feature data may be used as an applicable condition of service experience data.

It should be noted that Table 5 uses an MOS as an example for description. During other service, the service experience analytics data may alternatively be a service delay, a packet loss rate, a service success rate, an average satisfaction degree of users on the service (for example, 80% of users are satisfied with the service experience), and the like.

TABLE 5

Training result of the service experience model

| Application | UE location | Timestamp/Period | Identification information of a user plane path | Service experience analytics data |
|---|---|---|---|---|
| Application ID x | RAN 1 | 12:00-13:00 | UPF 1 ID + DNAI 1 | 4.5 |
| | | | UPF 1 ID + DNAI 2 | 4 |
| | | | UPF 2 ID + DNAI 3 | 3 |
| | RAN 2 | 21:00-22:00 | UPF 1 ID + DNAI 1 | 4 |
| | | | UPF 1 ID + DNAI 2 | 4.5 |
| | | | UPF 2 ID + DNAI 3 | 3 |

The foregoing Table 5 shows only a model training result of the service x (where the service x corresponds to one service type, and the service x is identified by the service ID x). Certainly, during actual service, the training result of the service experience model may further include a training result of another service, for example, a model training result of the service y (where the service y corresponds to one service type) or a model training result of a service z (where the service z corresponds to one service type).

It can be learned from Table 5 that the feature data includes the service type, the UE location, the timestamp/period, and the identification information of the user plane path. Certainly, during specific service, the feature data may alternatively include only some information of the service type, the UE location, the timestamp/period, and the user plane path, for example, include the service type and the identification information of the user plane path, or include the service type, the identification information of the user plane path, and the UE location. Alternatively, the feature data may further include other information. This is not limited in this application. The following describes the user plane path selection method provided in this application with reference to FIG. 2. The method may be used in a procedure in which a terminal device establishes a session, or may be used when a service is initiated after the terminal device establishes the session.

Figure 2:
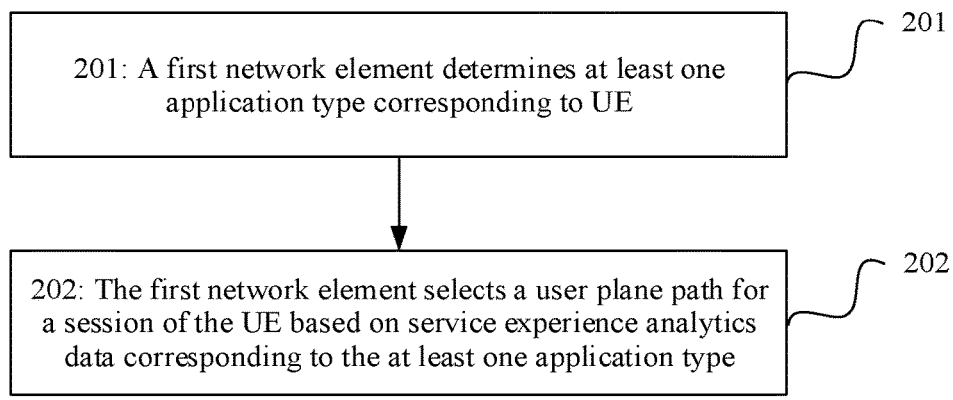
FIG. 2 is a schematic flowchart of a user plane path selection method according to this application.

As shown in FIG. 2, the method includes the following steps.

Step 201: A first network element determines at least one service type corresponding to UE.

In an implementation, the first network element may determine the at least one service type of the UE based on service behavior analytics data of the UE.

In an implementation, the first network element may obtain the service behavior analytics data of the UE from an NWDAF. For example, before step 201, the first network element sends a request message to the NWDAF, where the request message includes identification information of the UE, and the request message is used to request to obtain the service behavior analytics data of the UE. After receiving the request message, the NWDAF sends the service behavior analytics data of the UE to the first network element, for example, sends a part or all of the information in Table 2 to the first network element. Optionally, the request message further includes a filter condition, and the request message is used to request to obtain the service behavior analytics data that is of the UE and that meets the filter condition. For example, the filter condition may be a time and/or a location, and the request message is used to request service behavior analytics data of the UE at the time and/or at the location. For example, the first network element requests, from the NWDAF, to obtain service behavior analytics data of UE 1 (identified by a UE ID) at a location corresponding to a RAN 1 in a period 12:00-13:00, and the NWDAF sends, to the first network element, the service behavior analytics data corresponding to a service of the UE 1 that occurs at the location corresponding to the RAN 1 in the period 12:00-13:00.

In an example, the request message may be a subscription request message, and the subscription request message is used to subscribe to the service behavior analytics data of the UE. For example, the first network element may subscribe to the service behavior analytics data of the UE from the NWDAF when the UE registers with a network. After receiving the subscription request message, the NWDAF starts to collect related data, generates the service behavior analytics data of the UE, and then sends the generated service behavior analytics data of the UE to the first network element.

In another example, the request message may be an instant request message, and the instant request message is used to instantly request the service behavior analytics data of the UE. After receiving the instant request message, the NWDAF obtains the service behavior analytics data of the UE that has been generated in advance, and then sends the service behavior analytics data to the first network element.

In the foregoing implementation, the first network element obtains service behavior analytics data of one or more UEs from the NWDAF at a granularity of UE, and service behavior analytics data of each UE is relatively independent. In this design, the first network element sends a request message (which may be a subscription request message or an instant request message) to the NWDAF, where the request message carries identification information of the one or more UEs. Subsequently, the NWDAF sends, to the first network element, the service behavior analytics data corresponding to each UE. In another possible implementation, the first network element may alternatively obtain service behavior analytics data of one or more user groups from the NWDAF at a granularity of a user group, where one user group includes identification information of one or more UEs, and service behavior analytics data of each user group represents a common service behavior feature of all users in the group. In this design, the first network element sends a request message (which may be a subscription request message or an instant request message) to the NWDAF, where the request message carries identification information of the one or more user groups. Subsequently, the NWDAF sends, to the first network element, the service behavior analytics data corresponding to each user group. For example, after determining a massive internet of things (MIOT) user group based on a mobility attribute of UE, the first network element subscribes to/requests service behavior analytics data of the user group from the NWDAF.

In another implementation, if the first network element locally stores the service behavior analytics data of the UE, the first network element may locally obtain the service behavior analytics data of the UE. In this implementation, it is actually equivalent to describing that the first network element performs a function, in the foregoing implementation, of obtaining the service behavior analytics data of the UE by the NWDAF.

Based on the foregoing descriptions, the first network element may obtain the service behavior analytics data of the UE, and then determine the at least one service type of the UE based on the service behavior analytics data of the UE.

For example, the first network element may determine all service types in the service behavior analytics data of the UE as the at least one service type of the UE. In other words, the method is to use all the service types in the service behavior analytics data of the UE as service types corresponding to services that may be initiated by the UE after a session is established.

For another example, the first network element may alternatively determine a part of service types in the service behavior analytics data of the UE as the at least one service type of the UE, for example, determine one or more service types with a largest occurrence probability in the UE as the at least one service type of the UE. In other words, the method is to use the one or more service types with the largest occurrence probability in the service behavior analytics data of the UE as one or more service types corresponding to one or more services that may be initiated by the UE after a session is established.

For another example, the first network element may alternatively determine the at least one service type based on the service behavior analytics data and service behavior data of the UE that is obtained when a session is established or after the session is established. The service behavior data may include a time at which the UE establishes the session, a location at which the UE establishes the session, and the like. In an example, it is assumed that the UE establishes a first session at a first location in a period 12:00-13:00. In this case, the first network element may use, as the at least one determined service type, a part or all of service types that are in the service behavior analytics data of the UE and that correspond to the first location and the period 12:00-13:00.

In the foregoing implementation, the first network element determines the at least one service type of the UE based on the service behavior analytics data of the UE. In other words, before a service is actually initiated, the first network element predicts, based on historical service behavior of the UE, one or more types of services to be initiated by the UE in the future. However, in another implementation, if the UE has initiated one or more services, the first network element only needs to determine one or more service types based on service identification information of the initiated service.

Step 202: The first network element selects a user plane path for the session of the UE based on service experience analytics data corresponding to the at least one service type.

In an implementation, the first network element may obtain the service experience analytics data corresponding to the at least one service type from the NWDAF. In another implementation, the first network element may alternatively obtain, from the first network element, the service experience analytics data corresponding to the at least one service type. In this implementation, it is equivalent to describing that the first network element performs a function of obtaining the service experience analytics data corresponding to the at least one service type by the NWDAF.

The following uses only an example in which the first network element obtains the service experience analytics data corresponding to the at least one service type from the NWDAF for description.

In an implementation, the first network element may obtain a correspondence among a service type, service experience analytics data, and identification information of a user plane path, and select one or more user plane paths for the session of the UE based on the correspondence. Based on the foregoing descriptions, if the NWDAF stores the training result, shown in Table 5, of the service experience model, the first network element may obtain, from the NWDAF, the identification information that is of the user plane path and that corresponds to the service type and the service experience analytics data corresponding to the identification information of the user plane path. For example, the following provides three implementations.

Implementation 1: The first network element sends a request message to the NWDAF, where the request message includes identification information of the at least one service type, and the first network element receives, from the NWDAF, identification information that is of a user plane path and that corresponds to the at least one service type and the service experience analytics data corresponding to the identification information of the user plane path.

For example, the request message includes identification information of a service x, identification information of a service y, and identification information of a service z, where the service x, the service y, and the service z each correspond to one service type. In this case, the NWDAF sends, to the first network element, identification information that is of a user plane path and that corresponds to the service x, the service y, and the service z, and service experience analytics data corresponding to the identification information of the user plane path. Optionally, the request message may further carry a filter condition. For example, the filter condition includes a time and/or a location. For example, the filter condition is: a time (12:00-13:00) and a location (a RAN 1), and the first network element is an SMF or a PCF. In this case, the first network element may further obtain, based on identification information that is of a user plane path, that corresponds to the service type, and that meets the filter condition and service experience analytics data corresponding to the identification information of the user plane path that are obtained from the NWDAF, user plane paths and corresponding service experience analytics data that are shown in Table 6.

In the implementation 1, the SMF/PCF does not need to indicate a user plane path, but the NWDAF directly obtains a user plane path corresponding to a service type (optionally, obtains a user plane path that corresponds to a service type and that meets a filter condition, where the user plane path may be one or more user plane paths), analyzes service experience analytics data of the user plane path, and then sends identification information of the user plane path and the corresponding service experience analytics data to the SMF/PCF.

TABLE 6

User plane paths and corresponding service experience analytics data that are obtained by the SMF/PCF

| Timestamp/Period | UE location | Identification information of a user plane path | Application | Service experience analytics data |
|---|---|---|---|---|
| 12:00-13:00 | RAN 1 | UPF 1 ID + DNAI 1 | Application x | 4.5 |
|  |  |  | Application y | 3 |
|  |  |  | Application z | 3.5 |
|  |  |  | . . . | . . . |
|  |  | UPF 1 ID + DNAI 2 | Application x | 4 |
|  |  |  | Application y | 4 |
|  |  |  | Application z | 4.5 |
|  |  |  | . . . | . . . |
| . . . | . . . | . . . | . . . | . . . |

Implementation 2: The first network element sends a request message to the NWDAF, where the request message includes identification information of the at least one service type and a filter condition, the filter condition is the same as a condition used by the first network element to select the user plane path, and the filter condition is used by the NWDAF to determine identification information that is of a user plane path and that corresponds to the identification information of the at least one service type, and the first network element receives, from the NWDAF, the identification information that is of the user plane path and that corresponds to the at least one service type and the service experience analytics data corresponding to the identification information of the user plane path, that is, obtains the identification information of the user plane path and the service experience analytics data that meet the filter condition.

The request message carries the identification information of the at least one service type and the filter condition (for example, a DNN, single network slice selection assistance information (S-NS SAI), a time, or a place), but does not carry the identification information of the user plane path. The NWDAF determines the service experience analytics data that corresponds to the at least one service type and that meets the filter condition.

Based on the method, after obtaining the service experience analytics data, the first network element determines the identification information of the user plane path based on the filter condition, and then associates the identification information of the user plane path with the received service experience analytics data.

For example, the request message carries identification information (a service ID x) of a service x and a filter condition, where the filter condition is a DNN 1. The NWDAF returns a service MOS=3 that corresponds to the service x and that meets the filter condition. An SMF/a PCF can determine, based on the filter condition such as the DNN 1, that a corresponding path is determined based on a UPF 1 ID+a DNAI 1, and the SMF associates the three (that is, the service x, the MOS=3, and the UPF 1 ID+the DNAI 1).

For another example, the request message includes identification information of a service x, identification information of a service y, identification information of a service z, and filter conditions. For example, the filter conditions are a filter condition 1 (a time (12:00-13:00), a location (a RAN 1), a DNN 1, and S-NSSAI 1), a filter condition 2 (a time (12:00-13:00), a location (a RAN 1), a DNN 1, and S-NSSAI 2), and a filter condition 3 (a time (12:00-13:00), a location (a RAN 1), a DNN 2, and S-NSSAI 3). The service x is used as an example. This is similar for other services. The NWDAF obtains service experience analytics data that is of the service x and that meets the foregoing three filter conditions, and the NWDAF sends the service x, the filter conditions, and the corresponding service experience analytics data to the SMF/PCF.

In conclusion, the SMF/PCF can obtain the identification information that is of the user plane path and that corresponds to the service type and the service experience analytics data corresponding to the identification information of the user plane path, and further, the SMF/PCF can also obtain the user plane paths and the corresponding service experience analytics data that are shown in Table 6.

A main difference between the implementation 2 and the implementation 1 lies in: in the implementation 1, the NWDAF needs to determine a user plane path corresponding to a service type, and returns the user plane path to the SMF/PCF, while in the implementation 2, the NWDAF does not need to do so, and the SMF/PCF determines a user plane path based on a filter condition, where the user plane path is locally stored by the SMF/PCF and is used by the SMF/PCF to associate the user plane path with service experience analytics data.

Implementation 3: The first network element sends a request message to the NWDAF, where the request message includes identification information of the at least one service type and identification information that is of a user plane path and that corresponds to the identification information of the at least one service type, and the first network element receives, from the NWDAF, the identification information that is of the user plane path and that corresponds to the at least one service type and the service experience analytics data corresponding to the identification information of the user plane path.

In this implementation, an SMF/a PCF indicates a user plane path corresponding to a service type to the NWDAF. The NWDAF obtains service experience analytics data of the service type in the user plane path, and then sends identification information of the user plane path and the corresponding service experience analytics data to the SMF/PCF.

In a possible implementation, the request message carries identification information (for example, a UPF ID+a DNAI) of at least one user plane path and identification information of at least one service type, that is, the first network element requests, from the NWDAF, service experience analytics data of one or more types of services that corresponds to the identification information of the user plane path. After receiving the service experience analytics data, the SMF/PCF associates the sent user plane path with the received service experience analytics data.

For example, the request message includes identification information of a service x and a filter condition, where for example, the filter condition is: a time (12:00-13:00), a location (a RAN 1), a UPF 1 ID+a DNAI 1, and a UPF 2 ID+a DNAI 2, and the first network element is an SMF or a PCF. In this case, the first network element may obtain, from the NWDAF, identification information that is of a user plane path and that corresponds to the service type and service experience analytics data corresponding to the identification information of the user plane path, and further, the SMF/PCF can also obtain the user plane paths and the corresponding service experience analytics data that are shown in Table 6.

It should be noted that the request message in any one of the foregoing implementation 1 to implementation 3 may be a subscription request message or an instant request message. For example, the request message is a subscription request message. In this case, the subscription request message is used to subscribe to service experience analytics data of a service type. In other words, the first network element may subscribe to the service experience analytics data of the service type from the NWDAF. After receiving the subscription request message, the NWDAF starts to generate the service experience analytics data of the service type, and then sends the generated service experience analytics data to the first network element. For example, in an implementation, the SMF/PCF may invoke an Nnwdaf_EventsSubscription_Subscribe service, and includes {Event ID: Estimated service MOS, EventFilter (UPF list*, DNAI list*, service ID list*)} in the service, where Event ID indicates an identifier of an event, Estimated service MOS indicates that the event is requesting to obtain service experience analytics data, and EventFilter is a filter, where the filter includes the UPF list, the DNAI list, and the service ID list. The UPF list includes one or more UPF IDs, the DNAI list includes one or more DNAIs, and the service ID list includes one or more service IDs. Optionally, the filter further carries a time (for example, a time window), a UE location (an area), and the like.

For another example, the request message is an instant request message. In this case, the instant request message is used to instantly request service experience analytics data. After receiving the instant request message, the NWDAF obtains the service experience analytics data that has been generated in advance, and then sends the service experience analytics data to the first network element. For example, in an implementation, the SMF/PCF may invoke an Nnwdaf_AnalyticsInfo_Request response service or an Nnwdaf_EventsSubscription_Notify service, and includes (Event ID, UPF list*, DNAI list*, service ID list*, service MOS Analytics) in the service, where service MOS Analytics is service experience analytics data.

After obtaining the service experience analytics data, the first network element may select one or more user plane paths for the session of the UE. With reference to an example, the following describes a user plane path selection process based on Table 2 and Table 6, where the first network element is an SMF/a PCF.

For example, a current time is in a period 12:00-13:00, the UE is located at a location corresponding to a RAN 1, and the UE initiates session establishment. In this case, the SMF/PCF determines, based on Table 2, that a probability of initiating a service x at the location corresponding to the RAN 1 in the period 12:00-13:00 is the largest, such that the at least one service type determined by the SMF/PCF is the service x (where the service x corresponds to one service type). Then, the SMF/PCF determines, based on Table 6, that service experience analytics data corresponding to the service x in a user plane path 1 (a UPF 1 ID+a DNAI 1) that corresponds to the RAN 1 and the period 12:00-13:00 is 4.5 and that service experience analytics data corresponding to the service x in a user plane path 2 (the UPF 1 ID+a DNAI 2) that corresponds to the RAN 1 and the period 12:00-13:00 is 4, such that the SMF/PCF may determine that the user plane path selected for the session of the UE is the user plane path 1, where identification information of the user plane path 1 includes the DNAI 2 and identification information of a UPF 1.

For another example, a current time is in a period 12:00-13:00, the UE is located at a location corresponding to a RAN 1, and the UE initiates session establishment. In this case, the SMF/PCF determines, based on Table 2, that a probability of initiating a service x or a service y at the location corresponding to the RAN 1 in the period 12:00-13:00 is the largest, such that the at least one service type determined by the SMF/PCF is the service x (where the service x corresponds to one service type) and the service y (where the service y corresponds to one service type). Then, the SMF/PCF determines, based on Table 6, that service experience analytics data corresponding to the service x in a user plane path 1 (a UPF 1 ID+a DNAI 1) that corresponds to the RAN 1 and the period 12:00-13:00 is 4.5 and that service experience analytics data corresponding to the service x in a user plane path 2 (the UPF 1 ID+a DNAI 2) that corresponds to the RAN 1 and the period 12:00-13:00 is 4, such that the SMF/PCF may determine that the user plane path selected for the session of the UE is the user plane path 1, where identification information of the user plane path 1 includes the DNAI 1 and identification information of a UPF 1. In addition, the SMF/PCF determines that service experience analytics data corresponding to the service y in the user plane path 1 (the UPF 1 ID+the DNAI 1) that corresponds to the RAN 1 and the period 12:00-13:00 is 3 and that service experience analytics data corresponding to the service y in the user plane path 2 (the UPF 1 ID+the DNAI 2) that corresponds to the RAN 1 and the period 12:00-13:00 is 4, such that the SMF/PCF may determine that the user plane path selected for the session of the UE is the user plane path 2, where identification information of the user plane path 2 includes the DNAI 2 and the identification information of the UPF 1. That is, in this example, a user plane path selected by the SMF/PCF for the service x is the user plane path 1, and a user plane path selected by the SMF/PCF for the service y is the user plane path 2.

During implementation, the first network element may select one user plane path for the session of the UE, where the user plane path meets a service experience requirement (for example, the requirement is that the user plane path is optimal) corresponding to the at least one service type. In other words, the user plane path can enable service experience of each service type to meet the corresponding service experience requirement. For example, the at least one service type determined by the first network element includes only one service type. In this case, only one user plane path is finally determined, where the user plane path meets the service experience requirement corresponding to the at least one service type. For another example, the at least one service type determined by the first network element includes a plurality of service types, and the first network element determines a same user plane path for these service types. In this case, the user plane path needs to meet a service experience requirement corresponding to each of the at least one service type.

It should be noted that the foregoing uses an example in which the service experience requirement is that the user plane path is optimal for description. During implementation, the user plane path may alternatively be required to meet a condition: service experience analytics data corresponding to the user plane path is greater than a preset value. In this case, the finally selected user plane path is selected from user plane paths that meet the condition. For example, in user plane paths corresponding to a service x, there are three user plane paths whose corresponding service experience analytics data is greater than a preset value 4. In this case, one or more of the three user plane paths are further selected, randomly or based on a specific policy (for example, a load status of the path), as one or more final user plane paths.

In addition, if a same user plane path is selected for a plurality of service types, the user plane path is selected from all paths that simultaneously meet service experience requirements of the plurality of service types, that is, the user plane path meets the service experience requirements corresponding to the plurality of service types.

Alternatively, the first network element may select a plurality of user plane paths for the session of the UE, where the plurality of user plane paths separately meets a service experience requirement (for example, the requirement is that the user plane path is optimal) corresponding to the at least one service type. In other words, each selected user plane path needs to meet a service experience requirement corresponding to a service type corresponding to the user plane path. For example, a service x, a service y, and a service z respectively correspond to a user plane path 1, a user plane path 2, and a user plane path 3. In this case, the user plane path 1 needs to meet a service experience requirement corresponding to the service x, the user plane path 2 needs to meet a service experience requirement corresponding to the service y, and the user plane path 3 needs to meet a service experience requirement corresponding to the service z.

Based on the foregoing solution, the first network element determines, based on the at least one service type corresponding to the UE, the service experience analytics data corresponding to the at least one service type, and then selects one or more user plane paths for the session of the UE based on the service experience analytics data. This enables a user plane path to be associated with service experience, helps select a more appropriate user plane path for the UE, and can improve communication efficiency.

The user plane path selection solution may be used before the UE actually initiates a service (for example, when the UE initiates the session). To be more specific, the first network element predicts, based on historical service behavior of the UE, one or more types of services to be initiated by the UE in the future, and selects a user plane path for the session of the UE based on service experience analytics data of the one or more service types, where the user plane path can enable service experience of the type of the service to be initiated by the UE to meet a corresponding service experience requirement.

The user plane path selection solution may also be used when the UE actually initiates a service. To be more specific, the first network element selects a user plane path for the session of the UE based on service experience analytics data corresponding to a service type of the actually initiated service, where the user plane path can enable service experience of the service actually initiated by the UE to meet a corresponding service experience requirement. It may be understood that in this case, selection of the user plane path for the session of the UE is selection of the user plane path for the actually initiated service in the session of the UE.

Based on the foregoing method, after selecting the user plane path for the session of the UE, if the first network element (for example, the SMF, the PCF, or an AF) determines that the user plane path cannot meet the service experience requirement of the service initiated on the session of the UE, the first network element may reselect a user plane path for the initiated service based on the service experience analytics data corresponding to the initiated service.

The method in the foregoing embodiment is as follows. Before a specific service is initiated on the session of the UE, a service type corresponding to a service that may be initiated by the UE is predicted, and one or more user plane paths are selected for the UE based on the service type. However, in a possible design, when a specific service is initiated on the session of the UE, a service type of the service initiated on the session may be different from the predicted service type, consequently, the selected user plane path does not meet a service experience requirement (for example, the user plane path is not an optimal user plane path) of the specific initiated service. In this case, a user plane path may be considered to be reselected for the specific service of the session. A reselection method is not limited in this application. For example, reselection may be performed with reference to a user plane path selection method in the current technology, or may be performed based on the service type of the specific service and with reference to the user plane path selection method in this application. For example, the first network element predicts that a type of service to be initiated by the UE on a session 1 is a service x, and determines that an optimal user plane path corresponding to the service x is a user plane path 1 (including a UPF 1 and a media plane server 1). However, a service actually initiated by the UE on the session 1 is a service y, and the user plane path 1 is not an optimal user plane path of the service y, or it may be understood as that the user plane path 1 cannot meet a service experience requirement of the service y. In this case, the first network element may reselect a user plane path for the service y of the session. For example, the selected user plane path is a user plane path 2 (including the UPF 1 and a media plane server 2), and the user plane path 2 is the optimal user plane path of the service y, or it may be understood as that the user plane path 2 can meet the service experience requirement of the service y.

In another possible design, even if a service type corresponding to a specific service initiated by the UE is the same as the predicted service type, service behavior analytics data of the UE may be different because service behavior data of the UE at two time points (a time point at which the UE initiates the specific service and a time point at which the UE establishes the session) is different. For example, because a network location of the UE has been changed due to mobility, a user plane path selected based on service experience analytics data for an original location of the UE is not optimal. In this case, the first network element needs to reselect a user plane path based on service experience analytics data corresponding to a new location of the UE. Further, the user plane path may be reselected with reference to the user plane path selection method in this application. For example, the first network element predicts that a type of service to be initiated by the UE on a session 1 is a service x, and determines that an optimal user plane path corresponding to the service x is a user plane path 1 (including a UPF 1 and a media plane server 1), where when a time is in a period 12:00-13:00 and the UE is located at a location corresponding to a RAN 1, the user plane path 1 is the optimal user plane path. Subsequently, a service actually initiated by the UE on the session 1 is the service x, but the UE is not located at the location corresponding to the RAN 1 when the service x is initiated or the time at which the service x is initiated is not in the period 12:00-13:00. In this case, the user plane path 1 may not be the optimal user plane path of the service x, or it may be understood as that the user plane path 1 cannot meet a service experience requirement of the service x. In this case, the first network element may reselect a user plane path for the service x of the session based on the time at which the service x is initiated and/or a location of the UE when the service x is initiated. For example, the selected user plane path is a user plane path 2 (including the UPF 1 and a media plane server 2), and the user plane path 2 is the optimal user plane path of the service x, or it may be understood as that the user plane path 2 can meet the service experience requirement of the service x.

In another possible design, after the first network element selects a user plane path for the session of the UE based on a service actually initiated by the UE, the user plane path no longer meets a service experience requirement (for example, the user plane path is no longer an optimal user plane path) because service behavior data (for example, a network location of the UE or a time) of the UE is changed. In this case, the first network element needs to reselect a user plane path based on new service experience analytics data of the UE. Further, the user plane path may be reselected with reference to the user plane path selection method in this application. For example, the optimal user plane path selected by the first network element for the session of the UE is a user plane path 1 (including a UPF 1 and a media plane server 1). Subsequently, due to mobility of the UE, the user plane path 1 is no longer the optimal user plane path of the service x. In this case, the first network element may reselect an optimal user plane path for the service x based on a current location of the UE, for example, a user plane path 2 (including the UPF 1 and a media plane server 2).

It should be noted that, when the first network element is an SMF/a PCF, after the SMF/PCF selects a UPF and a media plane server, the SMF/PCF needs to send a DNAI corresponding to the selected media plane server to an AF, such that the AF determines the media plane server of a service based on the DNAI. For example, the DNAI may be sent to the AF before the service is initiated, or may be sent to the AF when the service is initiated. If the DNAI is sent to the AF before the service is initiated, an applicable condition of the DNAI such as identification information indicating the service corresponding to the DNAI, identification information of the UE, a time, or a location also needs to be sent, such that the AF selects the DNAI based on the applicable condition when the service is initiated, where the DNAI and the UPF selected by the SMF/PCF can match an optimal user plane path.

In addition, it should be noted that the foregoing method is described by using an example in which the SMF/PCF selects a user plane path (including a UPF and a media plane server) for the session of the UE. In another implementation, the SMF/PCF may select a UPF in a user plane path for the session of the UE, and the AF may select a media plane server in the user plane path for the session of the UE. It should be noted that, based on the user plane path selection method, in a possible design, the NWDAF may generate, based on the Table 5, a correspondence between a UPF and service experience analytics data (see the following Table 7) and a correspondence between a DNAI and service experience analytics data (see the following Table 8).

TABLE 7

Correspondence between a UPF and service experience analytics data

| Application | UE location | Timestamp/ Period | Identification information of a user plane path | Service experience analytics data |
|---|---|---|---|---|
| Application ID x | RAN 1 | 12:00-13:00 | UPF 1 ID | 4.3 |
|  |  |  | UPF 2 ID | 3 |
|  | RAN 2 | 21:00-22:00 | UPF 1 ID | 4.1 |
|  |  |  | UPF 2 ID | 3 |

TABLE 8

Correspondence between a DNAI and service experience analytics data

| Application | UE location | Timestamp/ Period | Identification information of a user plane path | Service experience analytics data |
|---|---|---|---|---|
| Application ID x | Location 1 | 12:00-13:00 | DNAI 1 | 4.5 |
|  |  |  | DNAI 2 | 4 |
|  |  |  | DNAI 3 | 3 |
|  | Location 2 | 21:00-22:00 | DNAI 1 | 4 |
|  |  |  | DNAI 2 | 4.5 |
|  |  |  | DNAI 3 | 3 |

The location 1 refers to an external geographic location corresponding to the RAN 1, and the location 2 refers to an external geographic location corresponding to the RAN 2.

Further, the SMF/PCF may obtain user plane paths and corresponding service experience analytics data that are shown in the foregoing Table 6 or the following Table 9. The AF may obtain user plane paths and corresponding service experience analytics data that are shown in the following Table 10.

TABLE 9

User plane paths and corresponding service experience analytics data that are obtained by the SMF/PCF

| Timestamp/ Period | UE location | Identification information of a user plane path | Application | Service experience analytics data |
|---|---|---|---|---|
| 12:00-13:00 | RAN 1 | UPF 1 ID | Application x | 4.3 |
|  |  |  | Application y | 3.5 |
|  |  |  | Application z | 4 |
|  |  |  | . . . | . . . |
|  |  | UPF 2 ID | Application x | 3 |
|  |  |  | Application y | 4 |
|  |  |  | Application z | 2 |
|  |  |  | . . . | . . . |
| . . . | . . . | . . . | . . . | . . . |

TABLE 10

User plane paths and corresponding service experience analytics data that are obtained by the AF

| Timestamp/Period | UE location | User plane path | Application | Service experience analytics data |
|---|---|---|---|---|
| 12:00-13:00 | Location 1 | DNAI 1 | Application x | 4.5 |
|  |  |  | Application y | 3.8 |
|  |  |  | Application z | 4 |
|  |  |  | ... | ... |
|  |  | DNAI 2 | Application x | 4 |
|  |  |  | Application y | 3 |
|  |  |  | Application z | 2 |
|  |  |  | ... | ... |
| ... | ... | ... | ... | ... |

The location 1 refers to an external geographic location corresponding to the RAN 1.

It should be noted that for generation of a correspondence between a DNAI and service experience analytics data, in addition to the foregoing method in which the NWDAF generates Table 8 based on Table 5, in another possible design, the NWDAF may further obtain, based on Table 2 and Table 5, a correspondence, shown in the following Table 11, among UE, a service type, a user plane path, and service experience analytics data. Further, the NWDAF may first analyze or predict, based on Table 2, a type of a service to be initiated by the UE in specific filter conditions (a time and a location), and then obtain, based on Table 5, a correspondence between a user plane path and service experience analytics data of the service type. In this case, the NWDAF may obtain Table 11 by combining results obtained in the two steps.

TABLE 11

Correspondence between a DNAI and service experience analytics data at a granularity of UE

| Identification information of UE | UE location | Timestamp/Period | Application type (Application) | Identification information of a user plane path | Service experience analytics data |
|---|---|---|---|---|---|
| UE 1 | Location 1 | 12:00-13:00 | Application ID x | DNAI 1 | 4.5 |
|  |  |  |  | DNAI 2 | 4 |
|  |  |  |  | DNAI 3 | 3 |
|  | Location 2 | 21:00-22:00 | Application ID y | DNAI 1 | 4 |
|  |  |  |  | DNAI 2 | 4.5 |
|  |  |  |  | DNAI 3 | 3 |
| UE 2 | Location 3 | 17:00-19:00 | Application ID x | DNAI 3 | 4.3 |
|  |  |  |  | DNAI 2 | 3.8 |
|  |  |  |  | DNAI 1 | 3 |
| ... | ... | ... | ... | ... | ... |

Further, an AF related to a specific service (for example, a service x) may obtain, from the NWDAF, user plane paths and corresponding service experience analytics data that are at a granularity of UE and that are shown in Table 12.

TABLE 12

User plane paths and corresponding service experience analytics data that are at a granularity of UE and that are obtained by the AF

| Application | Identification information of UE | UE location | Timestamp/Period | Identification information of a user plane path | Service experience analytics data |
|---|---|---|---|---|---|
| Application ID x | UE 1 | Location 1 | 12:00-13:00 | DNAI 1 | 4.5 |
|  |  |  |  | DNAI 2 | 4 |
|  |  |  |  | DNAI | 3 |
|  | UE 2 | Location 3 | 17:00-19:00 | DNAI 3 | 4.3 |
|  |  |  |  | DNAI 2 | 3.8 |
|  |  |  |  | DNAI 1 | 3 |
|  | ... | ... | ... | ... | ... |

Figure 3:
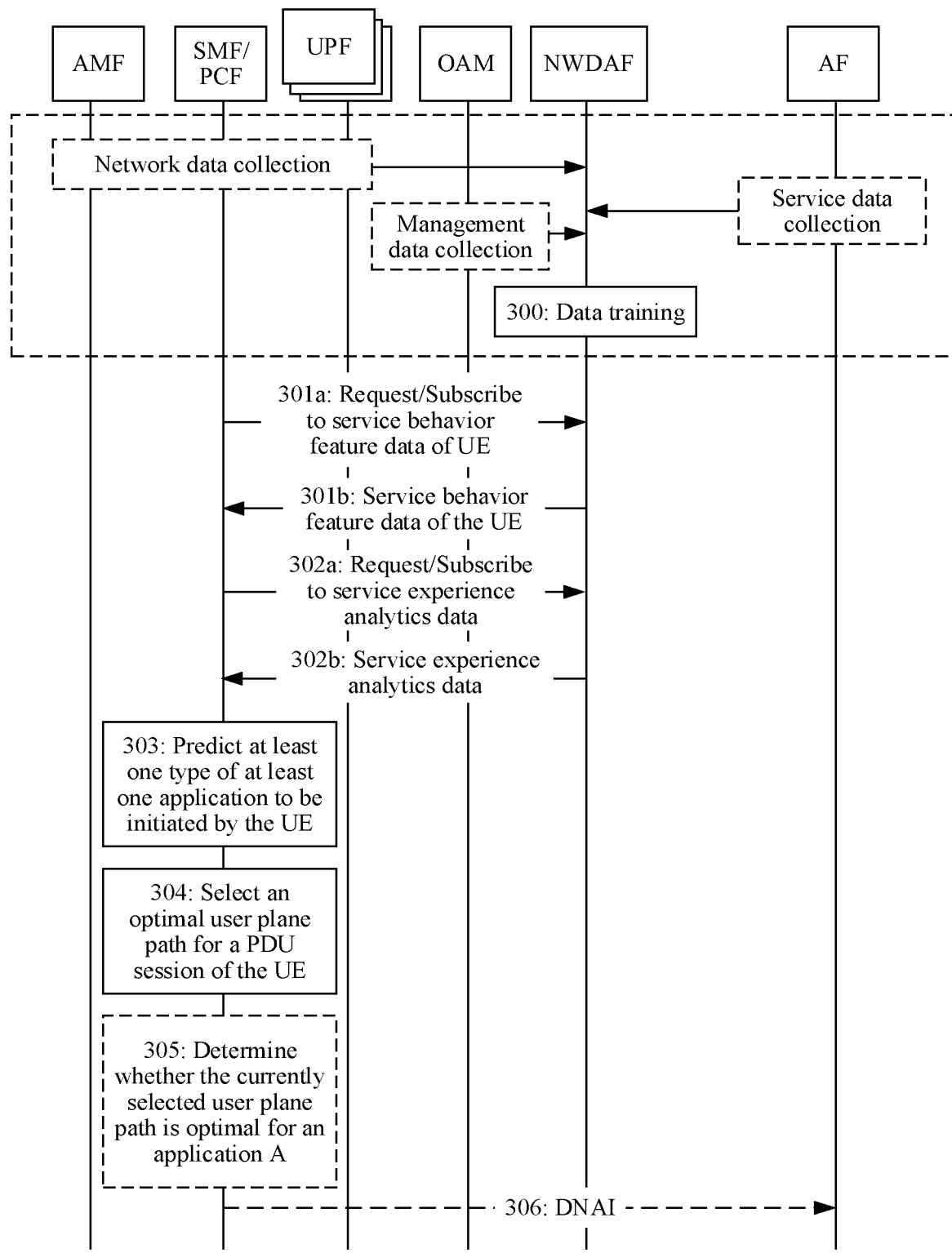
FIG. 3 is a schematic flowchart of another user plane path selection method according to this application.
Figure 4:
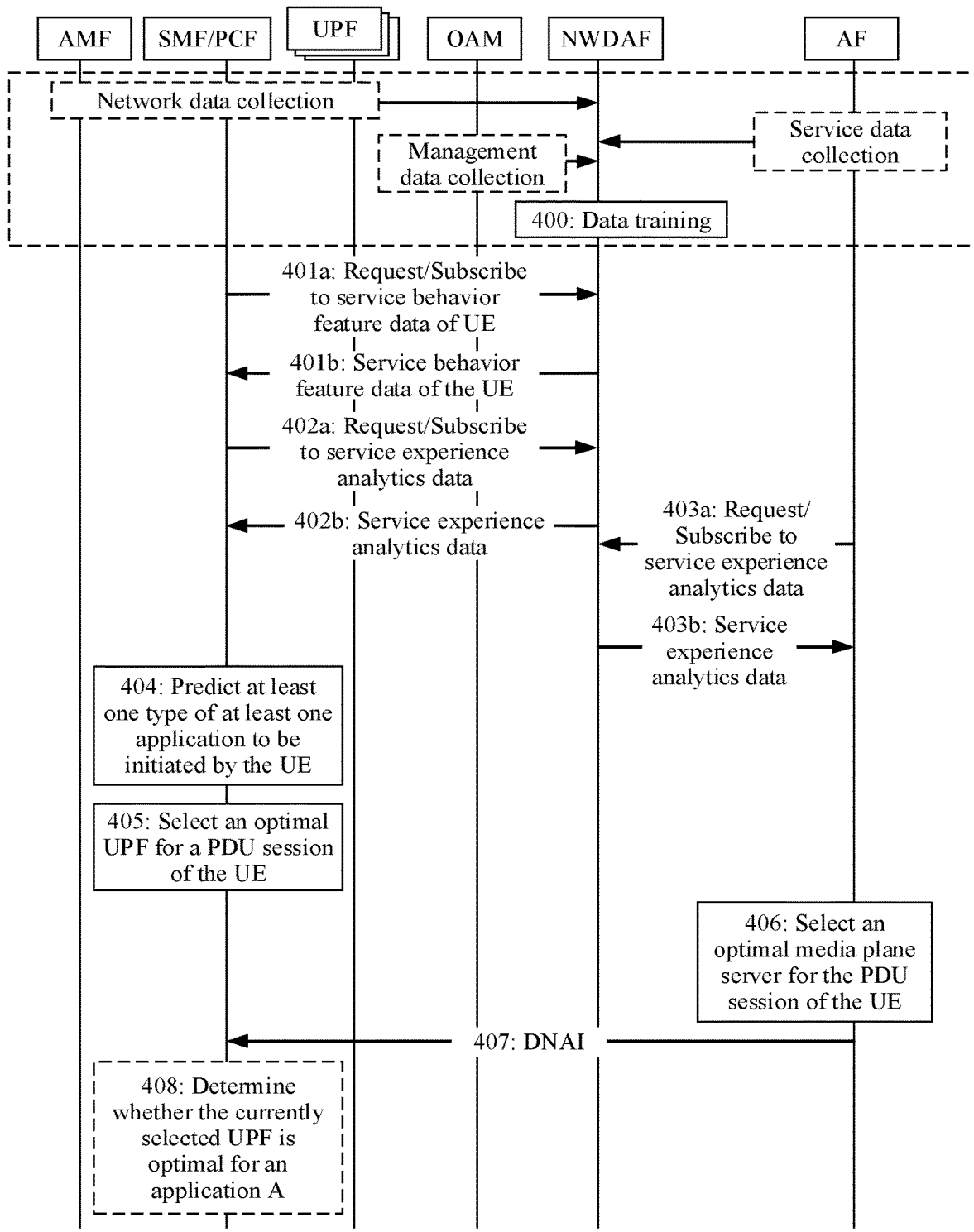
FIG. 4 is a schematic flowchart of another user plane path selection method according to this application.

The following separately describes the two implementations of the user plane path selection method in this application with reference to FIG. 3 and FIG. 4.

FIG. 3 shows another user plane path selection method according to this service. In the method, an SMF/a PCF selects a user plane path (including a UPF and a media plane server), that is, the UPF and the media plane server in the user plane path are both selected by the SMF/PCF.

The method includes the following steps.

Step 300: An NWDAF collects data, and performs training based on the collected data, to obtain, through analytics, a service behavior model of UE and a service experience model of a service.

For an implementation process of this step, refer to related descriptions in the embodiment shown in FIG. 2. Details are not described herein again.

Step 301a: The SMF/PCF subscribes to/requests service behavior analytics data of the UE from the NWDAF.

Step 301b: The NWDAF sends the service behavior analytics data of the UE to the SMF/PCF.

Step 302a: The SMF/PCF subscribes to/requests service experience analytics data corresponding to at least one user plane path from the NWDAF.

Step 302b: The NWDAF sends the service experience analytics data corresponding to the at least one user plane path to the SMF/PCF.

In an alternative implementation, step 302a and step 302b may alternatively be performed before step 301a and step 301b, or step 301a and step 302a may be combined into one step, and step 301b and step 302b may be combined into one step. This is not limited in this application.

Step 303: The UE initiates, in a network, a request for establishing a PDU session, and the SMF/PCF predicts, based on the service behavior analytics data of the UE, at least one type of at least one service to be initiated by the UE.

After the UE completes registration with a network, the UE initiates, to an SMF through an AMF based on a requirement of the UE, a request for establishing a session (a PDU session in 5G). The SMF/a PCF queries service behavior analytics data of the UE that has been stored by the SMF/PCF or (instantly) requests service behavior analytics data of the UE from the NWDAF. The SMF/PCF predicts at least one service type of the UE based on the service behavior analytics data of the UE, where the at least one service type is at least one type of at least one service to be initiated by the UE in the PDU session with a large probability, in other words, at least one type of at least one service that occurs at a specific moment and at a specific place in the future with a large probability after the UE establishes the PDU session. Further, if predicting that the UE may initiate a plurality of types of services, the SMF/PCF may further select at least one service type from the plurality of types based on an internal algorithm (for example, priorities, importance, service requirements, or occupied network resources of the services), for example, select service types corresponding to two services separately with the highest priority and the second highest priority.

Step 304: The SMF/PCF selects an optimal user plane path for the PDU session of the UE, where best (optimal) service experience of the at least one service can be achieved by using the user plane path.

For each service type determined in step 303, the SMF selects, based on service experience analytics data that corresponds to the service type, that corresponds to the at least one user plane path, and that has been obtained in step 302b, a user plane path that can enable service experience of the service to be optimal.

It should be noted that, when the UE initiates a PDU session at a specific network location, the UE has actually accessed a specific RAN. In this case, selection of a user plane path means selection of another user plane node, for example, selection of a UPF and a media plane server.

In a possible scenario, if the SMF/PCF determines only one service type in step 303, the SMF/PCF uses an optimal user plane path selected based on the service type as a user plane path of the entire PDU session, for example, uses a UPF in the user plane path as a UPF corresponding to the entire PDU session.

In another possible scenario, if the SMF/PCF determines a plurality of service types in step 303, in this step, the SMF/PCF may select a plurality of different user plane paths for the plurality of service types, for example, select two UPFs at the same time. In this case, the SMF/PCF may establish a multi-branch PDU session. For example, as described in a standard, a multi-homing PDU session is established, or an uplink classifier (uplink classifier, ULCL) UPF is inserted.

Step 305: When a specific service A is initiated, the SMF/PCF determines, based on obtained service experience analytics data that is of the service A and that corresponds to the at least one user plane path, whether the currently selected user plane path is optimal for the service A.

If the currently selected user plane path is optimal for the service A, the at least one currently obtained user plane path is maintained, if the currently selected user plane path is not optimal for the service A, an optimal user plane path is reselected for the service A (that is, user plane path switching is triggered). For example, the SMF/PCF may determine to trigger user plane path switching for the service A based on an internal algorithm or configuration policy (for example, a service priority, importance, a service requirement, or an occupied network resource of the service A). For example, if the SMF/PCF determines that the service A is an important MEC service, and the service A has a strict delay requirement, the SMF/PCF may trigger user plane path switching. Certainly, if the service priority or importance of the service A is relatively low, the SMF/PCF may alternatively determine not to trigger user plane path switching for the service A.

In a possible design, the user plane path switching may be performed by replacing the original user plane path with a new user plane path, and the SMF/PCF needs to trigger a UPF relocation procedure. In another possible design, the user plane path switching may be performed by inserting a new user plane path while maintaining the original user plane path. For example, as described in the standard, the SMF forms a multi-branch PDU session by inserting a ULCL or a branching point. For details, refer to the 3rd generation partnership project (3rd generation partnership project, 3GPP) TS 23.502.

Step 305 is an optional step.

Step 306: The SMF/PCF may further notify an AF corresponding to each service type of a DNAI corresponding to a media plane server included in the optimal user plane path.

Step 306 is an optional step.

For example, the SMF/PCF sends indication information (or notification information) to the AF, where the indication information (or the notification information) carries the DNAI, and may further carry information such as a UE ID, a corresponding time, and a corresponding place. In this way, the AF can learn, in advance, of an address (corresponding to the DNAI) of the optimal media plane server of the service initiated by the UE at the time and at the place, such that subsequently, when the UE triggers the service at the time and at the place, the AF can directly feed back the address of the optimal media plane server to the UE. In this processing method, UPF selection is used together with the DNAI, to obtain an optimal user plane path. Otherwise, even if the SMF selects an optimal UPF, if the DNAI is not a matched DNAI, the user plane path cannot be considered as optimal.

Based on this solution, a method for selecting user plane paths for different services of UE based on service behavior analytics data and service experience analytics data of the UE is provided. The user plane path selected in the method can help the UE obtain optimal service experience to the greatest extent, and subsequent user plane path reselection (or switching) can be avoided to the greatest extent. In addition, an NWDAF predicts the service behavior analytics data of the UE based on service behavior data of the UE, and sends the service behavior analytics data of the UE to an SMF/a PCF. The NWDAF obtains, through analytics, a service experience model based on historical service data, to obtain the service experience analytics data, and sends the service experience analytics data to the SMF/PCF. The SMF/PCF obtains, through association, service experience analytics data corresponding to different user plane paths.

FIG. 4 shows another user plane path selection method according to this application. In the method, an SMF/a PCF selects a UPF in a user plane path, and an AF selects a media plane server in the user plane path.

The method includes the following steps.

Step 400 is the same as step 300. For details, refer to the foregoing descriptions.

Step 401a: The SMF/PCF subscribes to/requests service behavior analytics data of UE from an NWDAF.

Step 401b: The NWDAF sends the service behavior analytics data of the UE to the SMF/PCF.

Step 401a and step 401b are the same as step 301a and step 301b. For details, refer to the foregoing descriptions.

Step 402a: The SMF/PCF subscribes to/requests service experience analytics data corresponding to at least one user plane path from the NWDAF.

Herein, a method in which the SMF/PCF subscribes to/requests the service experience analytics data corresponding to the at least one user plane path from the NWDAF is similar to the method in step 302a, but a difference lies in that the at least one user plane path in step 402a may include a UPF and a media plane server, or may include only a UPF, but the at least one user plane path in step 302a includes a UPF and a media plane server.

Step 402b: The NWDAF sends the service experience analytics data corresponding to the at least one user plane path to the SMF/PCF.

Herein, a method in which the NWDAF sends the service experience analytics data corresponding to the at least one user plane path to the SMF/PCF is similar to the method in step 302b, but a difference lies in that the at least one user plane path in step 402b may include a UPF and a media plane server, or may include only a UPF, but the at least one user plane path in step 302b includes a UPF and a media plane server.

In step 402a and step 402b, the SMF/PCF may obtain the user plane paths and the corresponding service experience analytics data that are shown in Table 6 or Table 9.

Step 403a: The AF subscribes to/requests service experience analytics data corresponding to at least one user plane path from the NWDAF.

Herein, a method in which the AF subscribes to/requests the service experience analytics data corresponding to the at least one user plane path from the NWDAF is similar to the method in step 302a, but a difference lies in that the at least one user plane path in step 403a includes a media plane server, but the at least one user plane path in step 302a includes a UPF and a media plane server.

Step 403b: The NWDAF sends the service experience analytics data corresponding to the at least one user plane path to the AF.

Herein, a method in which the NWDAF sends the service experience analytics data corresponding to the at least one user plane path to the AF is similar to the method in step 302b, but a difference lies in that the at least one user plane path in step 403b includes a media plane server, but the at least one user plane path in step 302b includes a UPF and a media plane server.

In step 403a and step 403b, the AF may obtain the user plane paths and the corresponding service experience analytics data that are shown in Table 10.

In another possible design, the AF may alternatively subscribe to/request, from the NWDAF in step 403a, service experience analytics data that corresponds to at least one user plane path and that is at a granularity of UE, and correspondingly, the NWDAF may send, to the AF in step 403b, the service experience analytics data that corresponds to the at least one user plane path and that is at the granularity of UE.

The subscription/request method in this design is similar to the foregoing method in step 403a, but a difference lies in that, in the method in step 403a, the service experience analytics data that is shown in Table 10, that corresponds to the at least one user plane path, and that is differentiated at a granularity of a service instead of a granularity of UE is subscribed to/requested, but in this design, the AF may obtain the service experience analytics data that is shown in Table 12, that corresponds to the user plane path, and that is at a granularity of UE.

It should be noted that there is no strict execution sequence among step 401a and step 401b, step 402a and step 402b, and step 403a and step 403b. For example, step 401a and step 401b may be first performed, step 402a and step 402b may be then performed, and step 403a and step 403b may be finally performed. For another example, step 402a and step 402b may be first performed, step 401a and step 401b may be then performed, and step 403a and step 403b may be finally performed. For another example, step 402a and step 402b may be first performed, step 403a and step 403b may be then performed, and step 401a and step 401b may be finally performed. For another example, step 403a and step 403b may be first performed, step 401a and step 401b may be then performed, and step 403a and step 403b may be finally performed. For another example, step 401a and step 402a are combined into one step for execution, and step 401b and step 402b are combined into one step for execution.

Step 404: The UE initiates, in a network, a request for establishing a PDU session, and the SMF/PCF predicts, based on the service behavior analytics data of the UE, at least one type of at least one service to be initiated by the UE.

Step 404 is the same as step 303. For details, refer to the foregoing descriptions.

Step 405: The SMF/PCF selects an optimal UPF for the PDU session of the UE, where best (optimal) service experience of the at least one service can be achieved through the UPF.

Step 405 is similar to step 304, but a difference lies in that the optimal user plane path (including a UPF and a media plane server) is selected in step 304, but only the optimal UPF is selected in step 405.

Step 406: When a specific service A is initiated, the AF selects an optimal media plane server for the PDU session of the UE.

Step 406 is similar to step 304, but a difference lies in that the optimal user plane path (including a UPF and a media plane server) is selected by the SMF/PCF in step 304, but only the optimal media plane server is selected by the AF in step 406. The AF may select the optimal media plane server for the PDU session of the UE based on Table 10 or Table 12. It may be understood that the AF selects the optimal media plane server for the PDU session of the UE means that the AF selects an optimal user plane path for the service A of the UE.

It should be noted that an example in which the AF directly selects an optimal media plane server for a specific service when the service is initiated is used for description herein. Certainly, during actual service, the AF may alternatively predict a service type of a service to be initiated on the session, for example, predict that the service A is to be initiated, and then select the optimal media plane server for the service A.

If the AF predicts the service type of the service to be initiated on the session, the AF may also perform steps similar to step 401a and step 401b, that is, the AF subscribes to/requests service behavior analytics data of the UE from the NWDAF, and then the NWDAF sends the service behavior analytics data of the UE to the SMF/PCF. For an implementation process, refer to related descriptions in step 401a and step 401b. In addition, the AF may further perform a step similar to step 404, that is, the AF selects an optimal media plane server for the PDU session of the UE. For an implementation, refer to related descriptions in the embodiment of FIG. 2.

Step 407: The AF sends a DNAI to the SMF/PCF, where the DNAI is used to identify the media plane server selected for the service A.

Step 408: When the service A is initiated, the SMF/PCF determines, based on obtained service experience analytics data that is of the service A and that corresponds to a UPF, whether the currently selected UPF is optimal for the service A.

If the currently selected UPF is optimal for the service A, the currently obtained UPF is maintained, if the currently selected UPF is not optimal for the service A, a UPF is reselected for the service A (that is, user plane path switching is triggered). For example, the SMF/PCF may determine to trigger user plane path switching for the service A based on an internal algorithm or configuration policy (for example, a service priority, importance, a service requirement, or an occupied network resource of the service A). For example, if the SMF/PCF determines that the service A is an important MEC service, and the service A has a strict delay requirement, the SMF/PCF may trigger user plane path switching. Certainly, if the service priority or importance of the service A is relatively low, the SMF/PCF may alternatively determine not to trigger user plane path switching for the service A.

Based on this solution, an NWDAF predicts service behavior analytics data of UE based on service behavior data of the UE, and sends the behavior analytics data of the UE to an SMF/a PCF. The NWDAF obtains, through analytics, a service experience model based on historical service data, to obtain service experience analytics data. In this way, the NWDAF obtains, through association, service experience analytics data corresponding to different user plane paths (UPF IDs+DNAIs). The NWDAF sends, based on the service experience analytics data corresponding to the different user plane paths (the UPF IDs+the DNAIs), service experience analytics data corresponding to different UPFs to the SMF/PCF and service experience analytics data corresponding to different media plane servers to an AF. The SMF/PCF determines a service type based on the service behavior analytics data and the service behavior data of the UE, and selects, based on the service type and service experience analytics data that is of the service type and that corresponds to different UPFs, an optimal UPF or a UPF that meets a preset service requirement. The AF selects, based on the service type and service experience analytics data that is of the service type and that corresponds to different media plane servers, an optimal media plane server or a media plane server that meets a preset service requirement. Therefore, an optimal user plane path is selected for a session of the UE.

The foregoing mainly describes the solutions provided in this application from a perspective of interaction between network elements. It may be understood that in the foregoing implementations, to implement the foregoing functions, the network elements include corresponding hardware structures and/or software modules for performing the foregoing functions. A person skilled in the art should easily be aware that, in combination with the units and algorithm steps in the examples described in the embodiments disclosed in this specification, the present disclosure can be implemented by hardware or a combination of hardware and computer software. Whether a function is performed by hardware or hardware driven by computer software depends on particular services and design constraints of the technical solutions. A person skilled in the art may use different methods to implement the described functions for each particular service, but it should not be considered that the implementation goes beyond the scope of the present disclosure.

Figure 5:
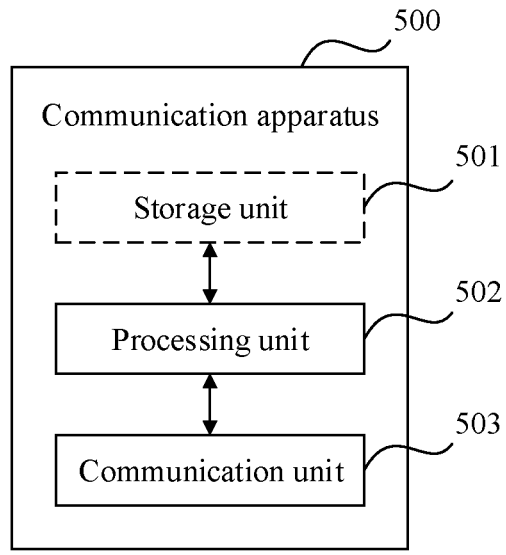
FIG. 5 is a schematic diagram of an apparatus according to this application.

FIG. 5 is a possible example block diagram of an apparatus according to this application, and the apparatus 500 may exist in a form of software or hardware. The apparatus 500 may include a processing unit 502 and a communication unit 503. In an implementation, the communication unit 503 may include a receiving unit and a sending unit. The processing unit 502 is configured to control and manage an action of the apparatus 500. The communication unit 503 is configured to support communication between the apparatus 500 and another network entity. The apparatus 500 may further include a storage unit 501 configured to store program code and data of the apparatus 500.

The processing unit 502 may be a processor or a controller, for example, may be a general-purpose central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processing unit 502 may implement or execute various example logical blocks, modules, and circuits described with reference to content disclosed in this application. The processor may alternatively be a combination of processors implementing a computing function, for example, a combination of one or more microprocessors, or a combination of the DSP and a microprocessor. The storage unit 501 may be a memory. The communication unit 503 is an interface circuit of the apparatus, and is configured to receive a signal from another apparatus. For example, when the apparatus is implemented in a form of a chip, the communication unit 503 is an interface circuit used by the chip to receive a signal from another chip or apparatus, or is an interface circuit used by the chip to send a signal to another chip or apparatus.

The apparatus 500 may be the first network element (for example, a session management network element, a policy control network element, or a server) in any one of the foregoing embodiments, or may be a chip used in the first network element. For example, when the apparatus 500 is the first network element, the processing unit 502 may be, for example, a processor, and the communication unit 503 may be, for example, a transceiver. Optionally, the transceiver may include a radio frequency circuit, and the storage unit may be, for example, a memory. For example, when the apparatus 500 is the chip used in the first network element, the processing unit 502 may be, for example, a processor, and the communication unit 503 may be, for example, an input/output interface, a pin, or a circuit. The processing unit 502 may execute computer-executable instructions stored in the storage unit. Optionally, the storage unit is a storage unit inside the chip, such as a register or a buffer. Alternatively, the storage unit may be a storage unit that is in the first network element and that is located outside the chip, such as a read-only memory (ROM), another type of static storage device that can store static information and instructions, or a random-access memory (RAM).

In an embodiment, the apparatus 500 is the first network element, and the processing unit is configured to determine at least one service type corresponding to a terminal device, and select a user plane path for a session of the terminal device based on service experience analytics data corresponding to the at least one service type.

In a possible implementation, the processing unit 502 is configured to obtain service behavior analytics data of the terminal device from a data analytics network element, and determine the at least one service type based on the service behavior analytics data of the terminal device.

In a possible implementation, the communication unit 503 is configured to send a request message to the data analytics network element, where the request message includes a filter condition, and the request message is used to request the service behavior analytics data that is of the terminal device and that meets the filter condition, and receive the service behavior analytics data of the terminal device from the data analytics network element, where the service behavior analytics data meets the filter condition.

In a possible implementation, the filter condition includes time information and/or location information.

In a possible implementation, the service behavior analytics data includes at least one of the following: identification information of a service, an occurrence probability of the service, duration of the service, a weight factor of the service, a location of the terminal device when the service occurs, or a time when the service occurs.

In a possible implementation, the processing unit 502 is further configured to select one user plane path for the session of the terminal device, where the user plane path meets a service experience requirement corresponding to the at least one service type.

In a possible implementation, the processing unit 502 is further configured to select a plurality of user plane paths for the session of the terminal device, where the plurality of user plane paths separately meets a service experience requirement corresponding to the at least one service type.

In a possible implementation, the processing unit 502 is further configured to, when the session is established, select the user plane path for the session of the terminal device.

In a possible implementation, the processing unit 502 is further configured to obtain identification information of a user plane path and the service experience analytics data that correspond to the at least one service type.

In a possible implementation, the communication unit 503 is configured to send a request message to the data analytics network element, where the request message includes identification information of the at least one service type, and receive, from the data analytics network element, the identification information of the user plane path and the service experience analytics data that correspond to the at least one service type.

In a possible implementation, the communication unit 503 is configured to send a request message to the data analytics network element, where the request message includes identification information of the at least one service type and a filter condition, and the filter condition is used to determine the identification information that is of the user plane path and that corresponds to the identification information of the at least one service type, and receive, from the data analytics network element, the identification information of the user plane path and the service experience analytics data that correspond to the at least one service type.

In a possible implementation, the processing unit 502 is further configured to, after selecting the user plane path for the session of the terminal device, determine that the user plane path cannot meet a service experience requirement of a service initiated by the terminal device on the session, and reselect a user plane path for the initiated service based on service experience analytics data corresponding to the initiated service.

In a possible implementation, the apparatus 500 is a session management network element or a policy control network element, and the processing unit 502 is configured to select a user plane function network element in the user plane path for the session of the terminal device.

In a possible implementation, the processing unit 502 is configured to select a media plane server in the user plane path for the session of the terminal device.

In a possible implementation, the apparatus 500 is a service server, and the processing unit 502 is configured to select a media plane server in the user plane path for the session of the terminal device.

It may be understood that, for an implementation process and a corresponding beneficial effect of the apparatus when the apparatus is used for the user plane path selection method, refer to related descriptions in the foregoing method embodiments, and details are not described herein again.

Figure 6:
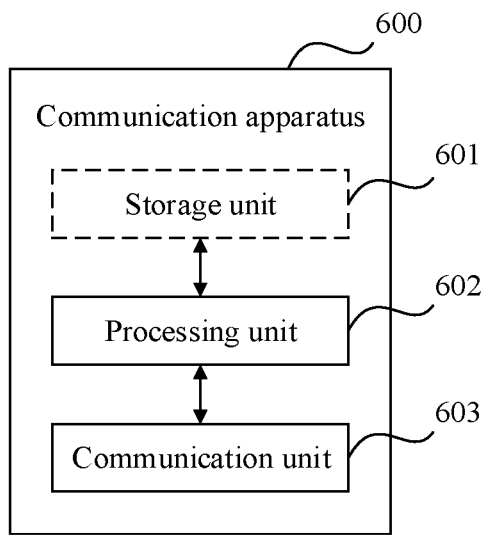
FIG. 6 is a schematic diagram of another apparatus according to this application.

FIG. 6 is a possible example block diagram of an apparatus according to this application, and the apparatus 600 may exist in a form of software or hardware. The apparatus 600 may include a processing unit 602 and a communication unit 603. In an implementation, the communication unit 603 may include a receiving unit and a sending unit. The processing unit 602 is configured to control and manage an action of the apparatus 600. The communication unit 603 is configured to support communication between the apparatus 600 and another network entity. The apparatus 600 may further include a storage unit 601 configured to store program code and data of the apparatus 600.

The processing unit 602 may be a processor or a controller, for example, may be a CPU, a general-purpose processor, a DSP, an ASIC, an FPGA or another programmable logic device, a transistor logic device, a hardware component, or any combination thereof. The processing unit 602 may implement or execute various example logical blocks, modules, and circuits described with reference to content disclosed in this application. The processor may alternatively be a combination of processors implementing a computing function, for example, a combination of one or more microprocessors, or a combination of the DSP and a microprocessor. The storage unit 601 may be a memory. The communication unit 603 is an interface circuit of the apparatus, and is configured to receive a signal from another apparatus. For example, when the apparatus is implemented in a form of a chip, the communication unit 603 is an interface circuit used by the chip to receive a signal from another chip or apparatus, or is an interface circuit used by the chip to send a signal to another chip or apparatus.

The apparatus 600 may be the data analytics network element in any one of the foregoing embodiments, or may be a chip used in the data analytics network element. For example, when the apparatus 600 is the data analytics network element, the processing unit 602 may be, for example, a processor, and the communication unit 603 may be, for example, a transceiver. Optionally, the transceiver may include a radio frequency circuit, and the storage unit may be, for example, a memory. For example, when the apparatus 600 is the chip used in the data analytics network element, the processing unit 602 may be, for example, a processor, and the communication unit 603 may be, for example, an input/output interface, a pin, or a circuit. The processing unit 602 may execute computer-executable instructions stored in the storage unit. Optionally, the storage unit is a storage unit inside the chip, such as a register or a buffer. Alternatively, the storage unit may be a storage unit that is in the data analytics network element and that is located outside the chip, such as a ROM or another type of static storage device that can store static information and instructions, or a RAM.

In an embodiment, the apparatus 600 is the data analytics network element, the processing unit 602 is configured to obtain service experience analytics data corresponding to at least one service type, and communication unit 603 is configured to send the service experience analytics data corresponding to the at least one service type to a first network element.

In a possible implementation, the communication unit 603 is configured to send, to the first network element, identification information that is of a user plane path and that corresponds to the service experience analytics data.

In a possible implementation, the communication unit 603 is configured to receive a request message sent by the first network element, where the request message includes identification information of the at least one service type.

In a possible implementation, the communication unit 603 is configured to receive a request message sent by the first network element, where the request message includes identification information of the at least one service type and the identification information that is of the user plane path and that corresponds to the identification information of the at least one service type.

In a possible implementation, the communication unit 603 is configured to receive a request message sent by the first network element, where the request message includes identification information of the at least one service type and a filter condition, and the filter condition is used to determine the identification information that is of the user plane path and that corresponds to the identification information of the at least one service type.

In a possible implementation, the processing unit 602 is configured to obtain service behavior analytics data of a terminal device, and the sending unit is configured to send the service behavior analytics data of the terminal device to the first network element.

In a possible implementation, the communication unit 603 is configured to receive a request message from the first network element, where the request message includes a filter condition, and the processing unit 602 is configured to obtain the service behavior analytics data that is of the terminal device and that meets the filter condition.

In a possible implementation, the filter condition includes time information and/or location information.

In a possible implementation, the service behavior analytics data includes at least one of the following: identification information of a service, an occurrence probability of the service, duration of the service, a weight factor of the service, a location of the terminal device when the service occurs, or a time when the service occurs.

In a possible implementation, the first network element is a session management network element or a policy control network element, and the identification information of the user plane path includes identification information of a user plane function network element.

In a possible implementation, the identification information of the user plane path further includes identification information of a media plane server.

In a possible implementation, the first network element is a server, and the identification information of the user plane path includes identification information of a media plane server.

It may be understood that, for an implementation process and a corresponding beneficial effect of the apparatus when the apparatus is used for the user plane path selection method, refer to related descriptions in the foregoing method embodiments, and details are not described herein again.

Figure 7:
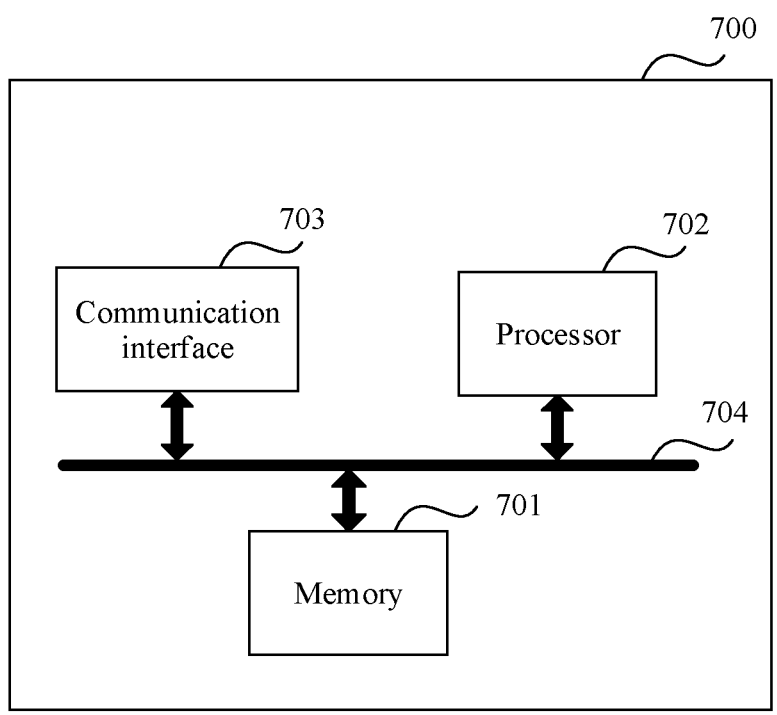
FIG. 7 is a schematic diagram of another apparatus according to this application.

FIG. 7 is a schematic diagram of an apparatus according to this service. The apparatus may be the data analytics network element or the first network element (for example, a session management network element, a policy control network element, or a server). The apparatus 700 includes a processor 702, a communication interface 703, and a memory 701. Optionally, the apparatus 700 may further include a communication line 704. The communication interface 703, the processor 702, and the memory 701 may be connected to each other through the communication line 704. The communication line 704 may be a Peripheral Component Interconnect (PCI) bus, an Extended Industry Standard Architecture (EISA) bus, or the like. The communication line 704 may be classified into an address bus, a data bus, a control bus, and the like. For ease of representation, only one thick line is used to represent the bus in FIG. 7, but this does not mean that there is only one bus or only one type of bus.

The processor 702 may be a CPU, a microprocessor, an ASIC, or one or more integrated circuits configured to control program execution in the solutions of this application.

The communication interface 703 uses any transceiver-type apparatus, to communicate with another device or a communication network such as the Ethernet, a radio access network (RAN), a wireless local area network (WLAN), or a wired access network.

The memory 701 may be a ROM or another type of static storage device that can store static information and instructions, or a RAM or another type of dynamic storage device that can store information and instructions, or may be an electrically erasable programmable ROM (EEPROM), a compact disc (CD) ROM (CD-ROM) or another compact disc storage, an optical disc storage (including a compact disc, a laser disc, an optical disc, a DIGITAL VERSATILE DISC (DVD), a BLU-RAY DISC, or the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor through the communication line 704. Alternatively, the memory may be integrated with the processor.

The memory 701 is configured to store computer-executable instructions for executing the solutions in this application, and the processor 702 controls the execution. The processor 702 is configured to execute the computer-executable instructions stored in the memory 701, to implement the user plane path selection method provided in the embodiments of this application.

Optionally, the computer-executable instructions in the embodiments of this application may also be referred to as application program code. This is not limited in the embodiments of this application.

A person of ordinary skill in the art may understand that various numerals such as "first" and "second" in this application are merely used for differentiation for ease of description, and are not used to limit the scope of the embodiments of this application or represent a sequence. The term "and/or" describes an association relationship for describing associated objects and represents that three relationships may exist. For example, A and/or B may represent the following three cases: only A exists, both A and B exist, and only B exists. The character "/" generally represents an "or" relationship between the associated objects. "At least one" means one or more. "At least two" means two or more. "At least one", "any one", or a similar expression thereof means any combination of these items, including a singular item (piece) or any combination of a plurality of items (pieces). For example, at least one (piece, or type) of a, b, or c may indicate a, b, c, a and b, a and c, b and c, or a, b, and c, where a, b, and c may be singular or plural. "A plurality of" indicates two or more, and another quantifier is similar to this. In addition, an element (element) that appears in singular forms "a", "an", and "the" does not mean "one or only one" unless otherwise specified in the context, but means "one or more". For example, "a device" means one or more such devices.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions through a general-purpose processor, a DSP, an ASIC, an FPGA or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an electrically programmable ROM (EPROM) memory, an EEPROM memory, a register, a hard disk, a removable magnetic disk, a CD-ROM, or a storage medium of any other form in the art. For example, the storage medium may be connected to the processor, such that the processor can read information from the storage medium and write information into the storage medium. Optionally, the storage medium may alternatively be integrated into the processor. The processor and the storage medium may be disposed in an ASIC.

These computer program instructions may alternatively be loaded onto a computer or another programmable data processing device, such that a series of operations and steps are performed on the computer or the other programmable device, to generate computer-implemented processing. Therefore, the instructions executed on the computer or the other programmable device provide steps for implementing a specified function in one or more processes in the flowcharts and/or in one or more blocks in the block diagrams.

Although this application is described with reference to example features and the embodiments thereof, it is clear that various modifications and combinations may be made to this application without departing from the spirit and scope of this application. Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:
1. A method, comprising:
  determining, by a session management function network element, a service type corresponding to a terminal device;

sending, by the session management function network element and to a data analytics network element, a request message comprising an indication of the service type;

receiving, by the session management function network element, from the data analytics network element, and in response to the request message, first service experience analytics data corresponding to the service type, wherein the first service experience analytics data comprises an identifier of at least one application and predicted service experience information for the at least one application; and selecting, by the session management function network element and based on the first service experience analytics data including the predicted service experience information for the at least one application, a first user plane path for a session of the terminal device.

2. The method of claim 1, wherein selecting the first user plane path comprises selecting the first user plane path when the session is being established.

3. The method of claim 1, further comprising obtaining first identification information of the first user plane path and the first service experience analytics data.

4. The method of claim 3, wherein the request message comprises second identification information of the service type and a filter condition, wherein the filter condition determines the first identification information, wherein the first identification information corresponds to the second identification information, and wherein obtaining the first identification information and the first service experience analytics data comprises receiving, from the data analytics network element in response to the request message, the first identification information and the first service experience analytics data.

5. The method of claim 1, wherein after selecting the first user plane path, the method further comprises:
    determining that the first user plane path cannot meet a service experience requirement of a service initiated by the terminal device on the session; and
    reselecting, based on second service experience analytics data corresponding to the service, a second user plane path for the service.

6. The method of claim 1, wherein selecting the first user plane path comprises selecting a user plane function network element in the first user plane path.

7. The method of claim 6, wherein selecting the first user plane path further comprises selecting a media plane server in the first user plane path.

8. The method of claim 1, wherein the first service experience analytics data further comprises location information and a data network access identifier (DNAI) for the at least one application.

9. An apparatus, comprising:
    one or more processors; and
    a memory coupled to the one or more processors and configured to store instructions, wherein the instructions, when executed by the one or more processors, cause the apparatus to:
        determine a service type corresponding to a terminal device;
        send, to a data analytics network element, a request message comprising an indication of the service type;
        receive, from the data analytics network element in response to the request message, first service experience analytics data corresponding to the service type, wherein the first service experience analytics data comprises an identifier of at least one application and predicted service experience information for the at least one application; and
        select, based on the first service experience analytics data including the predicted service experience information for the at least one application, a first user plane path for a session of the terminal device.

10. The apparatus of claim 9, wherein the instructions, when executed by the one or more processors, further cause the apparatus to select the first user plane path when the session is being established.

11. The apparatus of claim 9, wherein the instructions, when executed by the one or more processors, further cause the apparatus to obtain first identification information of the first user plane path and the first service experience analytics data.

12. The apparatus of claim 11, wherein the request message comprises second identification information of the service type and a filter condition, wherein the filter condition determines the first identification information, wherein the first identification information corresponds to the second identification information, and wherein the instructions, when executed by the one or more processors, further cause the apparatus to obtain the first identification information and the first service experience analytics data by receiving, from the data analytics network element in response to the request message, the first identification information and the first service experience analytics data.

13. The apparatus of claim 9, wherein the instructions, when executed by the one or more processors, further cause the apparatus to:
    determine that the first user plane path cannot meet a service experience requirement of a service initiated by the terminal device on the session; and
    reselect, based on second service experience analytics data corresponding to the service, a second user plane path for the service.

14. The apparatus of claim 9, wherein the apparatus is a session management network element, and wherein the instructions, when executed by the one or more processors, further cause the apparatus to select a user plane function network element in the first user plane path.

15. The apparatus of claim 14, wherein the instructions, when executed by the one or more processors, further cause the apparatus to select a media plane server in the first user plane path.

16. The apparatus of claim 9, wherein the apparatus is a service server, and wherein the instructions, when executed by the one or more processors, further cause the apparatus to select a media plane server in the first user plane path.

17. A computer program product comprising computer-executable instructions stored on a non-transitory computer-readable storage medium that, when executed by one or more processors, cause an apparatus to:
    determine a service type corresponding to a terminal device;
    send, to a data analytics network element, a request message comprising an indication of the service type;
    receive, from the data analytics network element in response to the request message, first service experience analytics data corresponding to the service type, wherein the first service experience analytics data comprises an identifier of at least one application and predicted service experience information for the at least one application; and
    select, based on the first service experience analytics data including the predicted service experience information for the at least one application, a user plane path for a session of the terminal device.

18. The computer program product of claim 17, wherein the computer-executable instructions further cause the apparatus to select the user plane path when the session is being established.

19. The computer program product of claim 17, wherein the request message further comprises a filter condition, and wherein the filter condition comprises slice information and place information.

* * * * *